United States Patent
Wu

(10) Patent No.: US 11,580,350 B2
(45) Date of Patent: Feb. 14, 2023

(54) SYSTEMS AND METHODS FOR AN EMOTIONALLY INTELLIGENT CHAT BOT

(71) Applicant: Microsoft Technology Licensing, LLC, Redmond, WA (US)

(72) Inventor: Xianchao Wu, Tokyo (JP)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1430 days.

(21) Appl. No.: 15/386,946

(22) Filed: Dec. 21, 2016

(65) Prior Publication Data
US 2018/0174020 A1  Jun. 21, 2018

(51) Int. Cl.
| | | |
|---|---|---|
| *G06F 16/332* | (2019.01) | |
| *G06F 16/33* | (2019.01) | |
| *G06F 16/338* | (2019.01) | |
| *G06N 3/00* | (2006.01) | |
| *G06N 3/04* | (2006.01) | |
| *G06N 3/08* | (2006.01) | |
| *G06N 3/006* | (2023.01) | |

(52) U.S. Cl.
CPC ........... *G06N 3/006* (2013.01); *G06F 16/338* (2019.01); *G06F 16/3329* (2019.01); *G06F 16/3344* (2019.01); *G06N 3/0445* (2013.01); *G06N 3/08* (2013.01)

(58) Field of Classification Search
CPC ............. G06F 16/3329; G06F 16/3344; G06F 16/338; G06N 3/006; G06N 3/08; G06N 3/0445
See application file for complete search history.

(56) References Cited

U.S. PATENT DOCUMENTS

| | | |
|---|---|---|
| 9,420,227 B1 | 8/2016 | Shires et al. |
| 9,424,248 B2 | 8/2016 | Fitterer et al. |
| 2007/0294229 A1 | 12/2007 | Au |
| 2009/0248399 A1 | 10/2009 | Au |

(Continued)

FOREIGN PATENT DOCUMENTS

| | | |
|---|---|---|
| CA | 2924667 A1 | 3/2015 |
| EP | 1332491 B1 | 9/2007 |
| WO | 2002037474 A1 | 5/2002 |

OTHER PUBLICATIONS

Banchs et al ("IRIS: a Chat-oriented Dialogue System based on the Vector Space Model", Proceedings of the 50th Annual Meeting of the Association for Computational Linguistics, Jul. 8-14, 2012, pp. 37-42) (Year: 2012).*

(Continued)

*Primary Examiner* — Miranda M Huang
*Assistant Examiner* — Robert Lewis Kulp
(74) *Attorney, Agent, or Firm* — Newport IP, LLC; Leonard J. Hope

(57) ABSTRACT

Systems and methods for emotionally intelligent automated chatting are provided. The systems and method provide emotionally intelligent automated (or artificial intelligence) chatting by determining a context and an emotion of a conversation with a user. Based on these determinations, the systems and methods may select one or more responses from a database of responses to a reply to a user query. Further, the systems and methods are able update or train based on user feedback and/or world feedback.

16 Claims, 21 Drawing Sheets

(56) References Cited

U.S. PATENT DOCUMENTS

| | | | |
|---|---|---|---|
| 2011/0010367 A1 | 1/2011 | Jockish et al. | |
| 2015/0279366 A1* | 10/2015 | Krestnikov | H04W 4/70 704/235 |
| 2016/0042359 A1 | 2/2016 | Singh | |
| 2016/0164813 A1 | 6/2016 | Anderson et al. | |
| 2016/0342317 A1* | 11/2016 | Lim | G10L 15/22 |

OTHER PUBLICATIONS

Vanzo et al ("A context-based model for sentiment analysis in Twitter", Proceedings of COLING 2014: Technical Papers, Aug. 23-29, 2014, pp. 2345-2354) (Year: 2014).*

Rush et al ("A Neural Attention Model for Sentence Summarization", Proceedings of the 2015 Conference on Empirical Methods in Natural Language Processing, Sep. 17-21, 2015, pp. 279-389) (Year: 2015).*

Sordoni et al ("A Hierarchical Recurrent Encoder-Decoder for Generative Context-Aware Query Suggestion", https://arxiv.org/abs/1507.2221.pdf, arXiv:1507.02221v1 [cs.NE] Jul. 8, 2015, pp. 1-10) (Year: 2015).*

Mizukami et al ("Adaptive Selection From Multiple Response Candidates in Example-Based Dialogue", 2015 IEEE Workshop on Automatic Speech Recognition and Understanding (ASRU), Scottsdale, AZ, 2015, pp. 784-790) (Year: 2015).*

Bhaumik et al. ("An Empathizing Robot, Development of 'Human-like Emotions and Augmented Dynamics' (G.E.A.D) and it's Emotion Cloud", 2013 International Conference on Control, Automation, Robotics and Embedded Systems (CARE), 2013, pp. 1-8) (Year: 2013).*

Xu et al. ("Improving the Effectiveness of Information Retrieval with Local Context Analysis", ACM Transactions on Information Systems, vol. 18, No. 1, Jan. 2000, pp. 79-112) (Year: 2000).*

Yao et al ("An Attentional Neural Conversation Model with Improved Specificity", https://arxiv.org/pdf/1606.01292.pdf, arXiv: 1606.01292v1 [cs.CL] Jun. 3, 2016, pp. 1-10) (Year: 2016).*

"International Search Report and Written Opinion Issued in PCT Application No. PCT/US2017/065941", dated Feb. 22, 2018, 11 Pages. (MS#401033-WO-PCT).

Mehdad, et al., "Abstractive Summarization of Spoken and Written Conversations Based on Phrasal Queries", In Proceedings of the 52nd Annual Meeting of the Association for Computational Linguistics, Jun. 23, 2014, 1220-1230 pages.

Sood, et al., "Topic-Focused Summarization of Chat Conversations", In Proceedings of the 35th European conference on Advances in Information Retrieval, Mar. 24, 2013, 801-804 pages.

Uthus, et al., "Plans toward Automated Chat Summarization", In Proceedings of the Workshop on Automatic Summarization for Different Genres, Media, and Languages, Jun. 23, 2011, pp. 1-7.

Agrawal, et al., "Unsupervised Emotion Detection from Text Using Semantic and Syntactic Relations", In Proceedings of the IEEE/WIC/ACM International Joint Conferences on Web Intelligence and Intelligent Agent Technology, Dec. 4, 2012, pp. 346-353.

Pang, et al., "Opinion Question Answering by Sentiment Clip Localization", In Journal of ACM Transactions on Multimedia Computing, Communications, and Applications, vol. 12, Issue 2, Nov. 2015, 19 pages.

Yan, et al., "Learning to Respond with Deep Neural Networks for Retrieval-Based Human-Computer Conversation System", In Proceedings of the 39th International ACM SIGIR conference on Research and Development in Information Retrieval, Jul. 17, 2016, pp. 55-64.

* cited by examiner

SYSTEMS AND METHODS FOR AN EMOTIONALLY INTELLIGENT CHAT BOT

BACKGROUND

Bots are becoming more and more prevalent and are being utilized for more and more different tasks. As understood by those skilled in the art, bots are software applications that may run automated tasks over a network, such as the Internet. Chat bots are designed to conduct a conversation with a user via text, auditory, and/or visual methods to simulate human conversation. A chat bot may utilize sophisticated natural language processing systems or scan for keywords from a user input and then pull a reply with the most matching keywords or the most similar wording pattern from a database. However, chat bots are often limited to simple task driven conversations.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for emotionally intelligent automated chatting. The systems and methods as described herein provide emotionally intelligent automated (or artificial intelligence (AI)) chatting by determining a context and an emotion of a conversation with a user. Based on these determinations, the systems and methods as described herein select one or more responses from a database of responses to reply to the user query. Further, systems and methods as described herein are able update or train based on user feedback and/or world feedback. As such, the systems and methods as described herein perform emotionally intelligent automated chatting that is more effective, more engaging, easier to use, and more lifelike than previously utilized chat bots that were not able to select responses based on the conversation context and emotion.

One aspect of the disclosure is directed to a system for an emotionally intelligent chat bot. The system includes at least one processor and a memory. The memory encodes computer executable instruction that, when executed by the at least one processor, are operative to:
collect a query from a user;
determine context sentences for the query utilizing a neural network and a context summary model;
assign an emotion label to each sentence in the context sentences utilizing a sentiment analysis model to form labeled sentences;
select a result response from a response database utilizing a response prediction model; and
provide the result response to the user in reply to the query.
The determining of the context sentences comprises:
analyzing a collection with a vocabulary index utilizing a machine learning algorithm;
determining replaceable elements in the collection based on the analysis of the collection and replace the replaceable elements with a corresponding topic element to form a modified collection;
analyzing the modified collection to determine a number of times each element appears in the modified collection;
ranking elements in the modified collection based on the number of times to form ranked elements;
determining one or more contexts for the query based on the ranked elements;
determining a timing of each sentence in the modified collection;
scoring every sentence in the modified collection based on the timing and the one or more contexts; and
selecting one or more sentences with highest scores from the modified collection to form the context sentences.
The collection includes the query and at least one previously received query. The selecting the result response comprises assigning a relevancy score to each response in the response database based on the query and the labeled sentences, selecting a predetermined number of responses from the response database based on highest relevancy scores, and randomly selecting the result response from the predetermined number of responses In another aspect, a method for emotionally intelligent automated chatting is disclosed. The method includes:
collecting a query from a user;
determining context sentences for the query;
semantically analyzing each sentence of the context sentences;
determining an emotion label for every sentence in the context sentences based on the semantic analyzing to form labeled sentences;
assigning a relevancy score to each response in a response database based on the query and the labeled sentences;
selecting a result response from the response database based on relevancy scores; and
providing the result response to the user in reply to the query.
The determining of the context sentences comprises:
analyzing a collection with a vocabulary index utilizing a machine learning algorithm, wherein the collection includes the query;
determining replaceable elements in the collection based on the analysis of the collection and replacing the replaceable elements with a corresponding topic element to form a modified collection;
analyzing the modified collection to determine a number of times each element appears in the modified collection;
ranking elements in the modified collection based on the number of times to form ranked elements;
determining one or more contexts based on the ranked elements;
determining a timing of each sentence in the modified collection;
scoring sentences in the modified collection based the timing and the one or more contexts; and
selecting one or more sentences from the modified collection with highest scores to form the context sentences.

In yet another aspect of the invention, the disclosure is directed to a system for an emotionally intelligent chat bot. The system includes at least one processor and a memory. The memory encodes computer executable instruction that, when executed by the at least one processor, are operative to:
collect a query from a user;
determine one or more context sentences for the query based at least on the query;
assign an emotion label to each sentence in the one or more context sentences to form labeled sentences;
select a result response from a response database based on the labeled sentences; and provide the result response to the user in reply to the query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
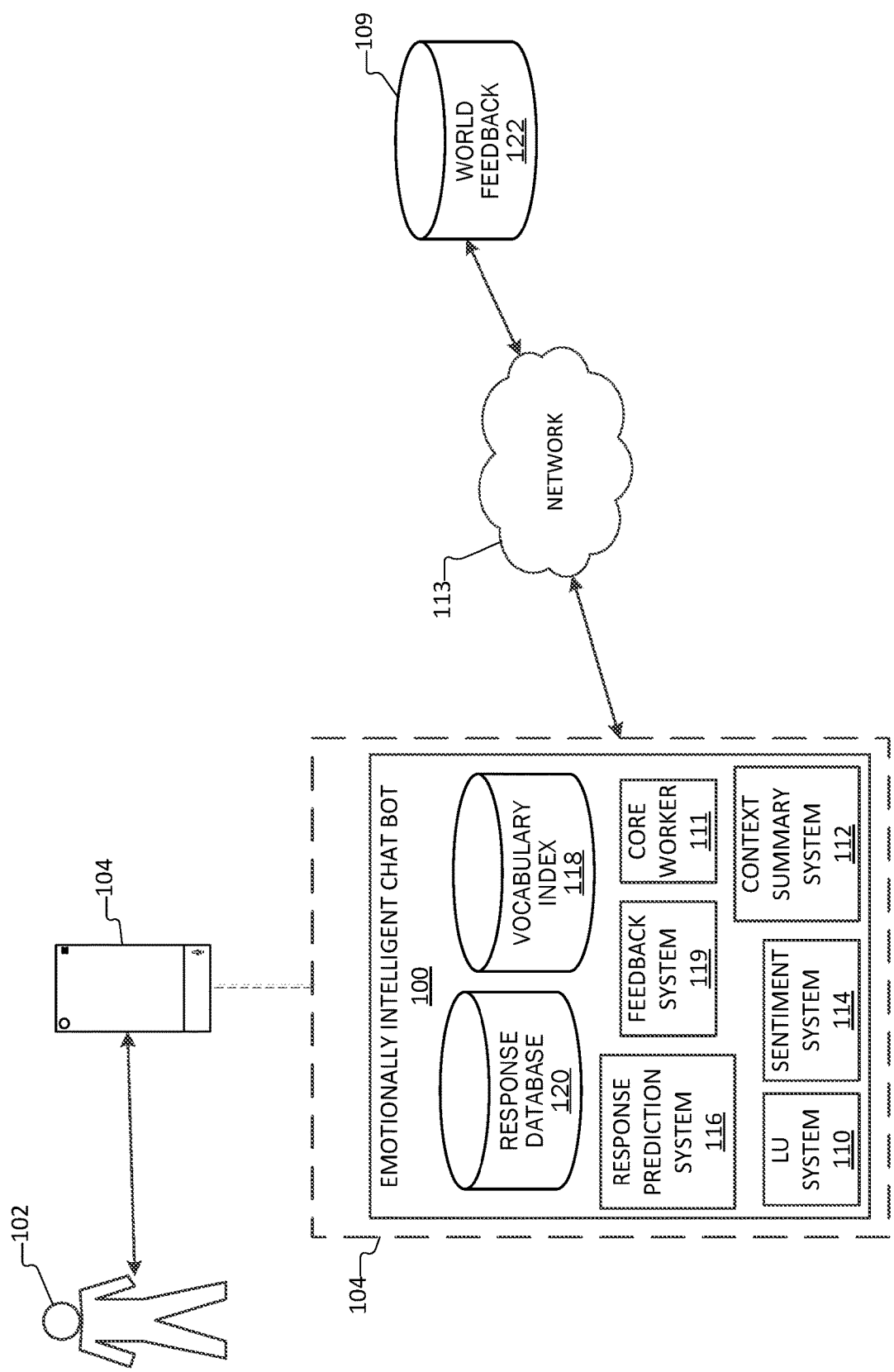
FIG. 1A is a schematic diagram illustrating an emotionally intelligent AI chat bot on a client computing device being utilized by a user, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Bots are becoming more and more prevalent and are being utilized for more and more different tasks. As understood by those skilled in the art, bots are software applications that may run automated tasks over a network, such as the Internet. Chat bots are designed to conduct a conversation with a user via auditory or visual methods to simulate human conversation. A chat bot may utilize sophisticated natural language processing systems or scan for keywords from a user input and then pull a reply with the most matching keywords or the most similar wording pattern from a database. Chat bots are often utilized for customer service or information acquisition. However, chat bots are often limited to simple task driven conversations.

For example, e-commerce online shopping customizes the general chat bots to fit individual shops (for clothes, shoes, cameras, cosmetics and so on) and supply online and in-time conversation-style consumer services. Through this multiple round conversation, the consumers' questions are answered and the consumers' orders will be consequently received. In addition, consumers' detailed requests are clarified step-by-step during the session of a conversation. However, these types of consumer service chat bots are typically designed to be single-round question-answering service. Further, the user can often tell that they are conversing with a chat bot due to the lack of emotion and limited task oriented questions and answers.

As such, the systems and method as disclosed herein are directed to an AI emotionally intelligent chat bot that can respond to user queries based on conversational context and the emotional tone of the conversation. The emotionally intelligent AI chat bot utilizes deep learning and sentiment analysis to determine conversational context and the emotional tone of the conversation and for response selection. Further, the emotionally intelligent AI chat bot utilizes user feedback and/or world feedback to train and update the learning models to improve the emotionally intelligent AI chat bot's responses over time based on each user and/or based on world user of the chat bot. In contrast, previously utilized AI chat bots required a substantial amount of manual authoring or updating for generating improved responses.

The ability of the systems and methods to perform emotionally intelligent automated chatting as described herein provides a chat bot that is capable of providing a contextually and emotionally appropriate response. Further, the ability of the systems and methods described herein to select contextually and emotionally appropriate responses improve the user's trust and engagement with chat bot. As such, the systems and methods to perform emotionally intelligent automated chatting as described herein provides a chat bot that is more effective, more engaging, easier to use, and more lifelike than previously utilized chat bots that were not able to select responses based on the conversation's context and emotion.

FIGS. 1A-1D illustrate different examples of an emotionally intelligent chat bot 100 or an emotionally intelligent AI chat bot 100 being utilized by a user, in accordance with aspects of the disclosure. The chat bot 100 is capable of determining a context and an emotion of a conversation with a user. Based on these determinations, the emotionally intelligent chat bot 100 can select the best response from a database of response to a reply to a user query.

Figure 1B:
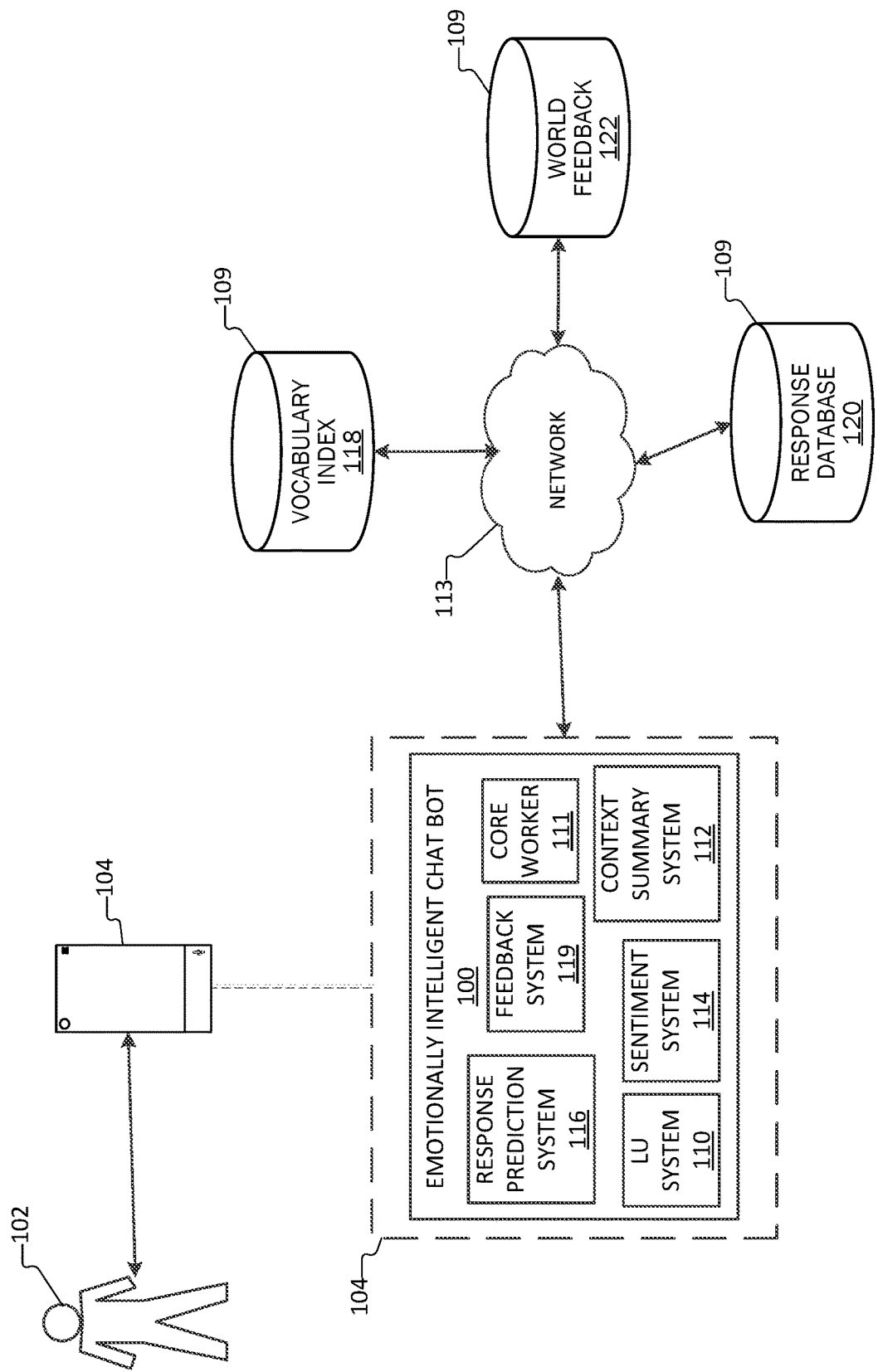
FIG. 1B is a schematic diagram illustrating an emotionally intelligent AI chat bot on a client computing device being utilized by a user, in accordance with aspects of the disclosure.
Figure 1C:
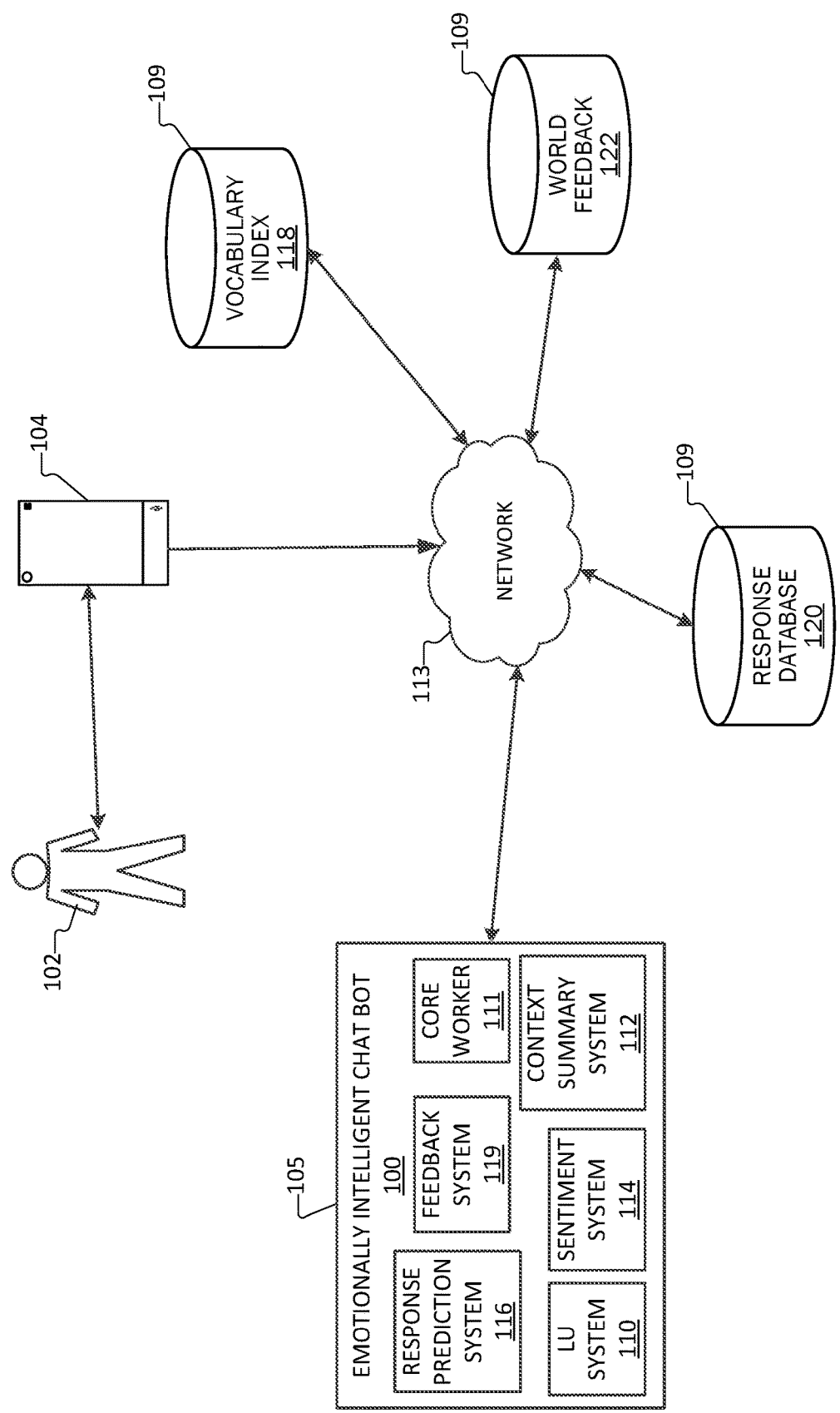
FIG. 1C is a schematic diagram illustrating an emotionally intelligent AI chat bot on a server computing device being utilized by a user via a client computing device, in accordance with aspects of the disclosure.
Figure 1D:
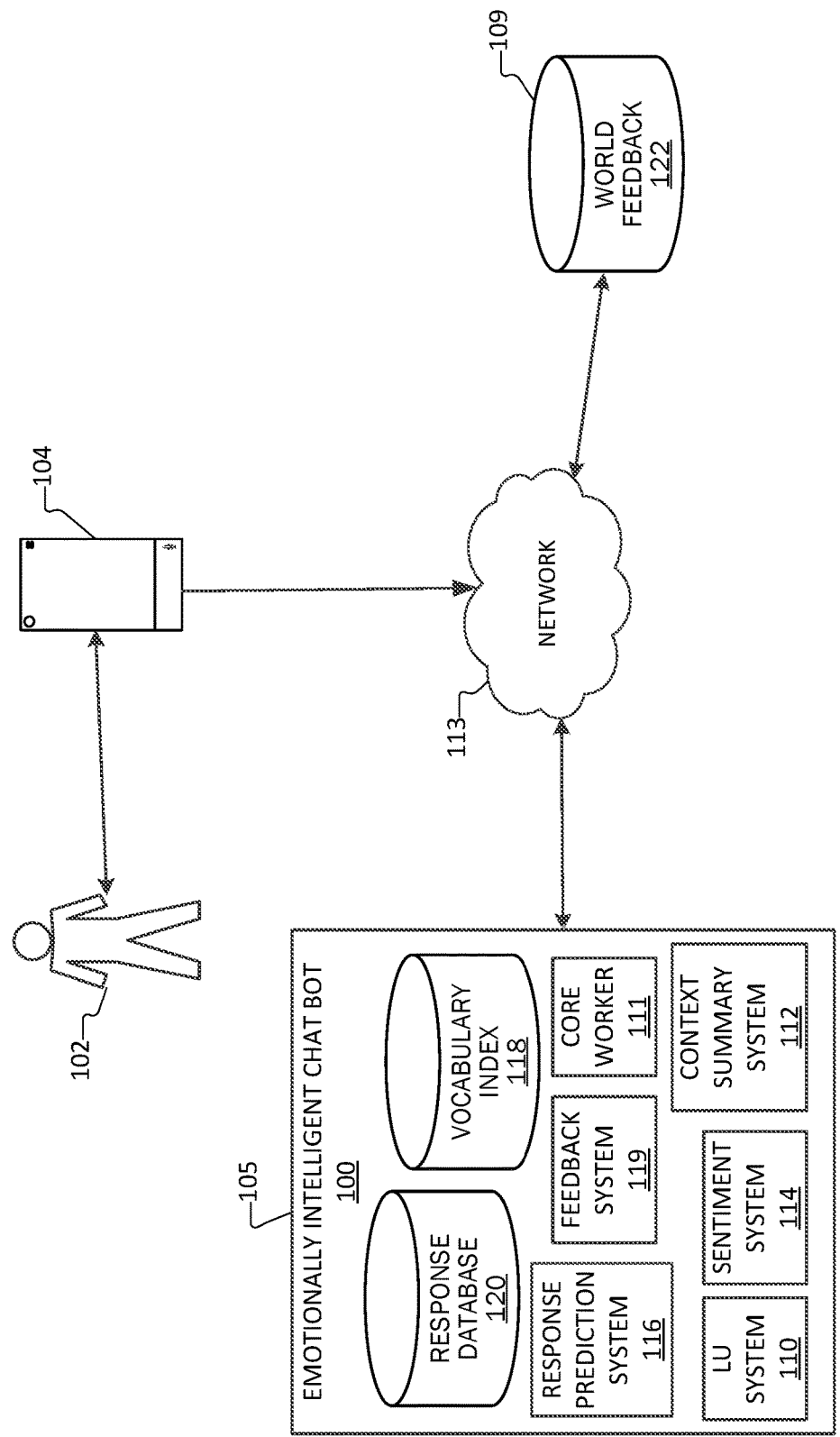
FIG. 1D is a schematic diagram illustrating an emotionally intelligent AI chat bot on a server computing device being utilized by a user via a client computing device, in accordance with aspects of the disclosure.

The chat bot 100 includes a language understanding (LU) system 110, a context summary system 112, a sentiment system 114, a response prediction system 116, a feedback system 119, and a core worker 111. In some aspects, the chat bot 100 also includes a vocabulary index 118 and/or a response database 120 as illustrated in FIGS. 1A and 1D. In alternative aspects, the response database 120 and the vocabulary index 118 are not part of the chat bot 100 and are instead separate and distinct from the chat bot 100 as illustrated in FIGS. 1B and 1C. In these embodiments, the chat bot 100 communicates with the response database 120 and the vocabulary index 118 via a network 113. In some aspects, the network 113 is a distributed computing network, such as the internet. The chat bot 100 may also communicate with other databases 109 and servers 105, such as database that tracks and stores world feedback 122.

In some aspects, the chat bot 100 is implemented on the client computing device 104 as illustrated by FIGS. 1A and 1B. In a basic configuration, the client computing device 104 is a computer having both input elements and output elements. The client computing device 104 may be any suitable computing device for implementing the chat bot 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the chat bot 100 and/or for communicating with the chat bot 100 may be utilized.

In other aspects, the chat bot 100 is implemented on a server computing device 105, as illustrated in FIGS. 1C and 1D. The server computing device 105 may provide data to and/or receive data from the client computing device 104 through the network 113. In further aspects, that chat bot 100 is implemented on more than one server computing device 105, such as a plurality or network of server computing devices 105. For example, the vocabulary index 118 may be located on server or database separate from a server containing the core worker 111. In some aspects, the chat bot 100 is a hybrid system with portions of the chat bot 100 on the client computing device 104 and with portions of the chat bot 100 on one or more server computing devices 105.

Figure 2:
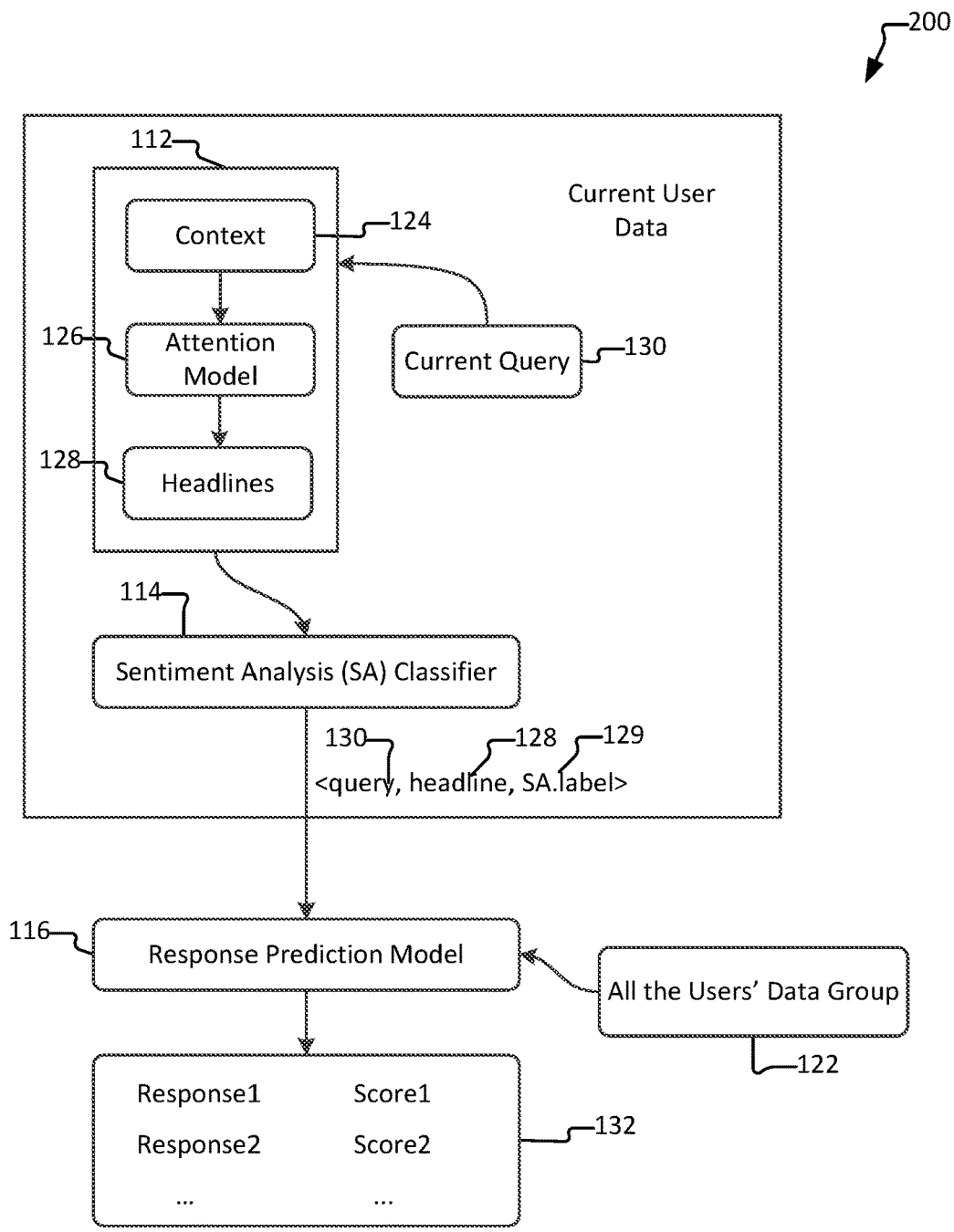
FIG. 2 is a schematic diagram illustrating a work flow for an emotionally intelligent AI chat bot, in accordance with aspects of the disclosure.

FIG. 2 illustrates a work flow diagram 200 for an emotionally intelligent AI chat bot 100, in accordance with aspects of the disclosure. The chat bot 100 is capable of determining a context 124, one or more context sentences 128 (or headlines 128) and an emotion label 129 for each context sentence 128 or headline 128 within the conversation with a user 102. Based on these determinations, the emotionally intelligent chat bot 100 can select one or more responses 132 from a database of responses 120 and provide the selected responses 132 to the user in reply to a received user query 130.

In some aspects, the response 132 is provided by the client computing device 104. In other aspects, the chat bot 100 sends instructions to the client computing device 104 to provide the response 132 to the user 102. The client computing device 104 provides any response 132 from the chat bot 100 utilizing any known visual, audio, tactile, and/or other sensory mechanisms. For example, the user interface of the client computing device 104 may display the response 132 determined by the chat bot 100 as text.

The user 102 inputs a query 130 into the user interface. A user query 130 as utilized herein refers to a user question, a user comment, or any other user input information intended for the chat bot 100. The user query 130 as utilized herein includes user answers. User answers as utilized herein refers to any user question, user comment, or any other user input information intended for the chat bot 100 that was entered by the user 102 in reply to a previous response 132 provided by the chat bot 100. The user 102 may provide his or her query 130 as text, video, audio, and/or any other known method for gathering user input. In the user's input area, a user 102 can type text, select emoji symbols, and make a short-cut of current screen. Additionally, the user 102 can make a voice call or a video conversation with the chat bot 100. For example, the user interface of the client computing device 104 may receive the user's query 130 as voice input.

The chat bot 100 collects the user query 130 from the client computing device 104. The term "collect" as utilized herein refers to the passive receiving or receipt of data and/or to the active gathering or retrieval of data. The core worker 111 of the chat bot 100 collects the user query 130.

Figure 3A:
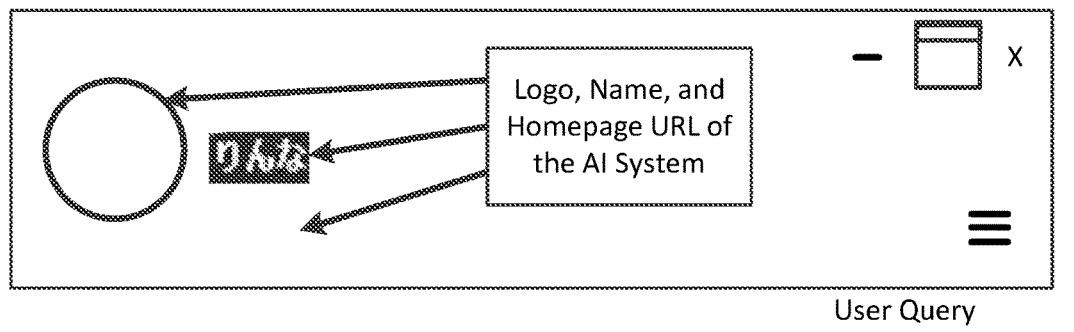
FIG. 3A is a schematic diagram illustrating a screen shot of a user interface of the user's client computing device during a conversation with an emotionally intelligent AI chat bot system, in accordance with aspects of the disclosure.
Figure 3A:
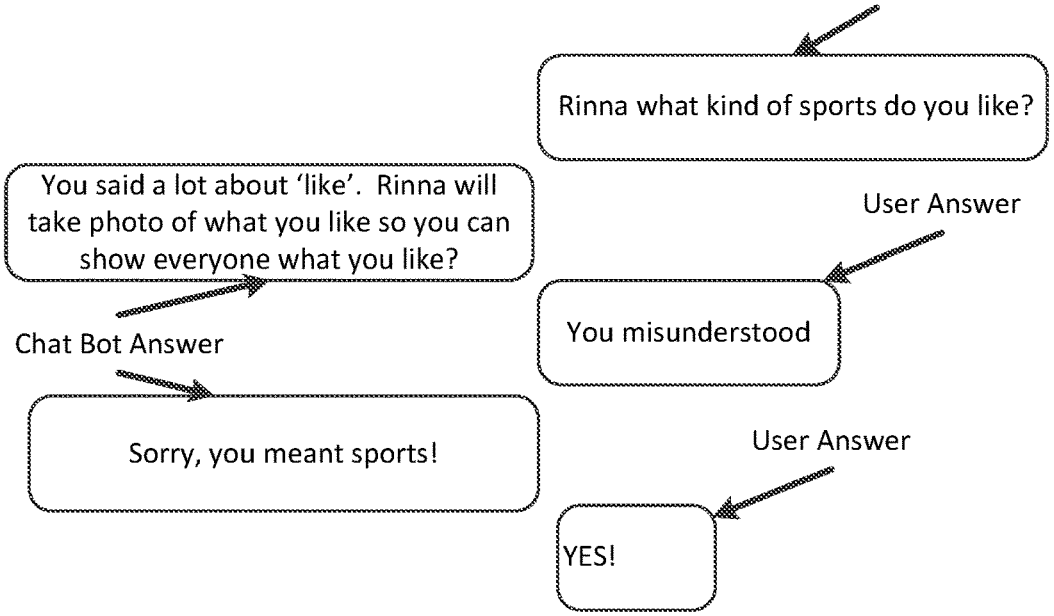
Figure 3A:
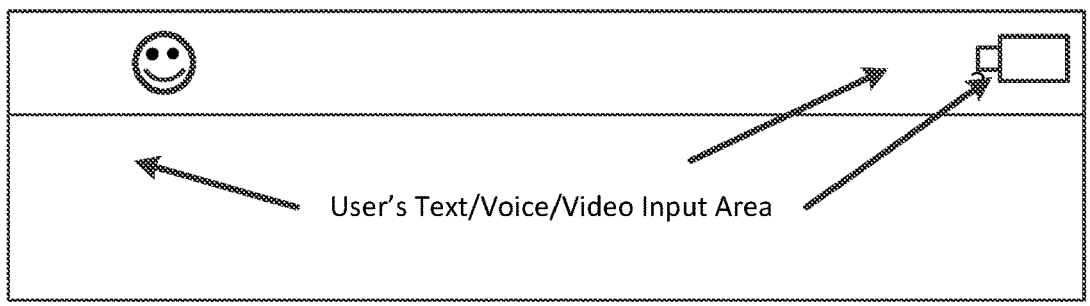
Figure 3B:
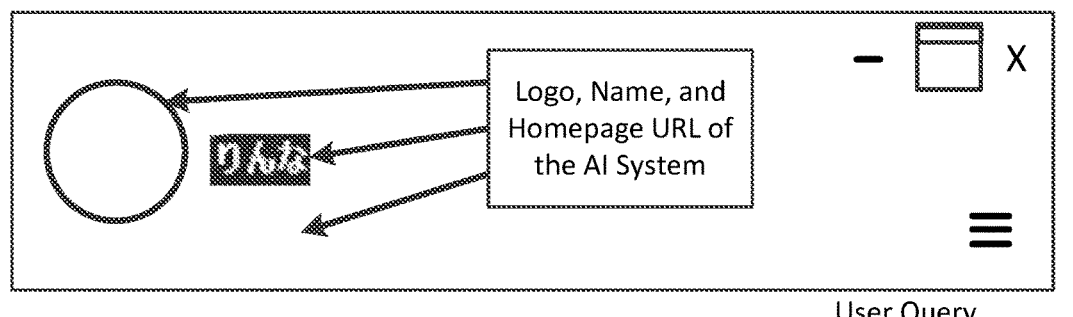
FIG. 3B is a schematic diagram illustrating a screen shot of a user interface of the user's client computing device during a conversation with an emotionally intelligent AI chat bot after being trained based on user feedback from the conversation illustrated in FIG. 3A, in accordance with aspects of the disclosure.
Figure 3B:
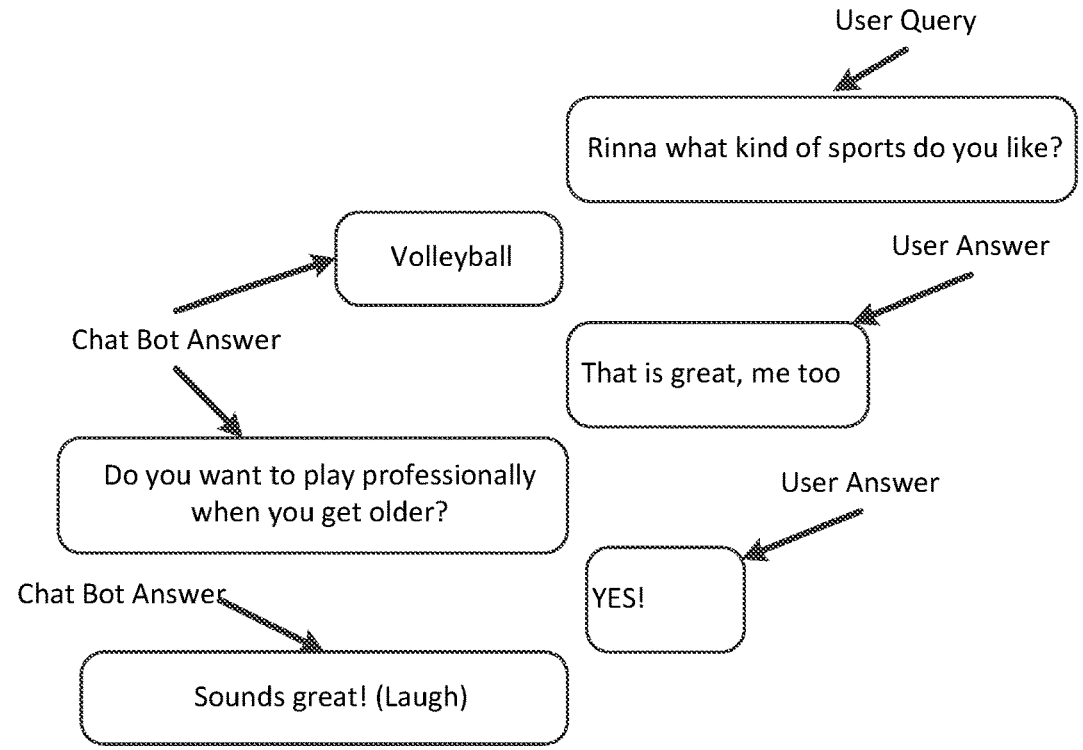
Figure 3B:
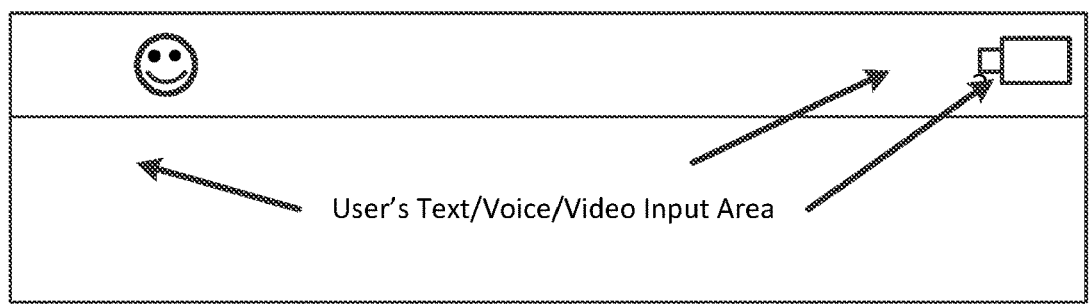

For example, in the user interface (UI) as shown in FIG. 3B, the chat bot 100 collects the user query 130, "Rinna what kind of sports do you like?". In FIGS. 3A-3B, Rinna stands for the name of the AI chat bot system. The above sentence is transferred to the "request queue", which stores users' requests in multimedia format including texts, sounds, images, and even videos by the core worker 111 of the chat bot 100. However, the chat bot 100 deals with different kinds of multimedia inputs differently. For example, for real-time sounds and videos, the AI chat both 100 needs a sufficient amount of core workers 111 to ensure that the queue is not too long so a user utilizing the chat bot 100 does not receive too long of a delay between his or her query 130 and the AI chat bot 100 reply 132. For texts and images, the chat bot 100 may utilize less core workers 111 for processing.

The core worker 111 collects the request queue as input. Requests in the queue are served and/or responded to in first-in-first-out manner by the core worker 111. As such, the core worker 111 will one-by-one determine a type of input (voice, video, text, etc.) of each query 130 for proper processing by the chat bot 100. For example, the core worker 111 will send the user queries 130 to the context summary system 112, the sentiment system 114, and/or the response prediction system 116.

The core worker 111 utilizes or sends the user's query 130 to a language understanding (LU) system 110 for processing. The LU system 110 converts the user's queries 130 into text and/or annotated text. The LU system 110 includes application programing interfaces (APIs) for text understanding, speech recognition, and/or image/video recognition for processing user queries 130 into text and/or annotated text form.

Sounds need to be recognized and decoded as texts. A speech recognition API may be necessary for the speech-to-text conversion task and is part of the LU system 110. Furthermore, the LU system 110 may need to convert a generated response 132 from text to voice to provide a voice response to the user 102. Further, the LU system 110 may also include an image recognition API to "read" and "understand" received images from the user 102. The image recognition API of the LU system 110 translates or decodes received images into text. Further, a response 132 by the chat bot 100 may be translated into images by the LU system 110 to provide an image response to the user 102. For example, if the selected response is good job, the LU system 110 could convert this text into a thumbs-up, which is displayed to the user as an image or emoticon. The core worker framework allows APIs to be easily added or removed. As such, the core worker framework is extensible.

The responses selected by the response prediction system 116 of the chat bot 100 are provided to the core worker 111. The core worker 111 transfers the response to the response queue or into a cache. The cache is necessary to make sure that a sequence of AI chat bot responses 132 or replies 132 can be shown to the user in a pre-defined time stream. That is, for one user's request, if there are no less than two responses generated by the core worker 111, then a time-delay setting for the responses may be necessary.

For example, if the user says, "Rinna, did you eat your breakfast?", the emotionally intelligent AI chat bot 100 may generate two responses, such as "yes, I ate bread," and "How about you? Still felling hungry?". In this scenario the core worker 111 ensures that the first response is provided to the user immediately. Also, the core worker 111 of the chat bot 100 may ensure that the second response is provided in a time delay, such as 1 or 2 seconds, so that the second message will be provided to the user two seconds after the first message. As such, the cache of the core worker 111 manages these to-be-sent response messages together with user identities and appropriate timing for each chat bot generated question or comment.

The text or annotated text generated by the LU system 110 is collected by the context summary system 112 of the chat bot 100. The context summary system 112 utilizes a learning algorithm, a vector system, and/or a feed-forward neural network language model to characterize and summarize the context information to some impact short sentence (with only high term weight words left) to help make a better context-sensitive classification/understanding of user's emotions. This proposed approach incorporates less linguistic structure than comparable abstractive summarization approaches, but can easily be scaled to be trained on large-scale data. Since the approach is not constrained by the vocabulary size, the context summary system 112 may be directly and timely trained online on any existing or new coming document-summary pair corpus.

The context summary system 112 analyzes the text or annotated text of the query 130 to determine a context 124 for the query 130. In some aspects, the context summary system 112 collects text or annotated text from or more previous turns of the conversation with the user along with the current user query 130, which is referred to herein as a collection, to determine the context 124 of the current user query 130. A collection as utilized herein refers to any user query 130 and/or chat bot response 132 analyzed by the context summary system 112 to determine the context 124.

The context summary system 112 determines the context 124 by analyzing the collection with a vocabulary index 118 utilizing a machine learning algorithm. The vocabulary index 118 is a database of words, phrases, and/or abbreviations that are mapped or graphed to one or more topic elements. In some aspects, the vocabulary index 118 identifies words or phrases by matching two adjacent words, the number or shared characters, and/or the number of characters in the whole word or phrase. Next, the context summary system 112 determines replaceable elements in the collection based on the analysis of the collection utilizing the machine learning algorithm and vocabulary index 118 and replaces the replaceable elements with a corresponding topic element to form a modified collection. For example, the context summary system 112 will replace pronouns, such as "he", "she", "him", "her", "I", "they", "them", "it", "that" etc. with the corresponding topic elements that these pronouns represent. For example, during a conversation about "Barrack Obama" the context summary system 112 will replace the words, "him", "he", the president", and "the commander in chief" with the corresponding topic element of "Barrack Obama."

Next, the context summary system 112 analyzes the modified collection to determine the number of times each element appears in the modified collection. The elements include words, abbreviations, or phrases and the topic elements. Next, the context summary system 112 ranks the elements based on the number of times each element is listed in the modified query to form ranked elements. After the elements have been ranked, the context summary system 112 determines one or more contexts 124 for the query 130 based on the ranked elements. For example, the context summary system 112 may select a set number of the highest ranked elements as the one or more contexts 124 of the conversation between the user 102 and the chat bot 100. Next, the context summary system 112 determines the timing of each sentence in the collection. The timing as utilized herein refers to when or how recently a sentence and/or query and/or context was collected by the chat bot 100 from the user 102. The context summary system 112 scores the sentences in the collection based on the timing and the one or more contexts. For example, sentences that were recently received and contain the one or more contexts 124 will be ranked higher than sentences that were not recently received and/or that do not contain the one or more contexts. Next, the context summary system 112 selects one or more sentences with the highest scores to form the context sentences 128. In some aspects, the context sentences 128 paraphrase the selected sentences.

In some aspects, the context summary system 112 utilizes a vector system and a feed-forward neural network language model to determine the context sentences 128 from the modified collection.

An example of the vector system and a feed-forward neural network language model to determine the context sentences 128 is provided below:

Input=a sequence of M words x=x1, . . . , xM; vocabulary V of size |V|=V; each word xi is an indicator vector, xi∈{0, 1}V for i∈{1, . . . , M}

Suppose, lexicon contains, 10 words V, lexicon=a b c d . . . 2 a b input a=(1, 0, 0, 0, 0, . . . )==the lexicon*M[0.1, 0.2, 0.4,]==="one-hot" vector b=(0, 1, 0, 0, 0, . . . )

c=(0, 0, 1, 0, 0,) . . .

Output=y=y1, . . . , yN of length N<M, x and y share the same vocabulary V

Figure 9:
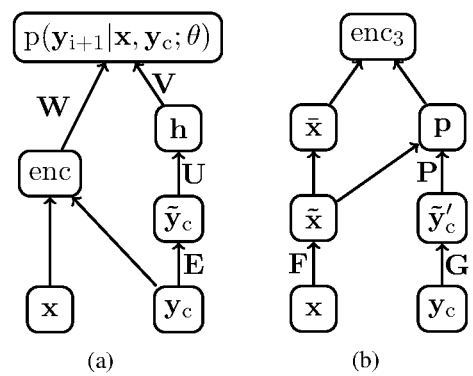
FIG. 9 is a schematic diagram illustrating an example of a neural network structure for the neural network language model decoder (NNLM) with additional encoder (enc) elements for section (a) and a network diagram for the attention-based encoder enc3 for section (b), in accordance with aspects of the disclosure.

Target: argmax $y$ $s(x,y)$ under a scoring function
$s: x^* y \rightarrow R$    EQ #1;

FIG. 9 illustrates a neural network structure for the neural network language model decoder (NNLM) with additional encoder (enc) elements with section (a) and a network diagram for the attention-based encoder enc₃ for section (b).

(a)—a network diagram for the NNLM decoder with additional encoder element.

(b)—a network diagram for the attention-based encoder enc3

X—input document $Yc-y[i-C+1, \ldots, i]$ output and with a window of size $C$    EQ #2

The core of the parameterization is a neural language model for estimating the contextual probability of the next word. The language model is adapted from a standard feed-forward neural network language model (NNLM). As such, in this aspect, the full model is:

$p(y_{i+1}|y_c,x;\theta) \propto \exp(Vh+W\mathrm{enc}(x,y_c))$ $\tilde{y}_c=[Ey_{i-C+1}, \ldots, Ey_i],$ $h=\tan h(U\tilde{y}_c).$    EQ #3

The parameters are 0=(E, U, V, W), where

E∈RD*V is a word embedding matrix, each word with D dimensions;

U∈R (CD)*H, V∈RV*H, W∈R V*H are weight matrices; and h is a hidden layer of size H.

The black-box function enc is a contextual encoder term that returns a vector of size H representing the input and current (output) context.

By incorporating in enc and training the two elements jointly (two branches in figure (a)), the system can crucially incorporate the input text into generation. The attention-based encoder we use here is formulized in FIG. 10

Figure 10:
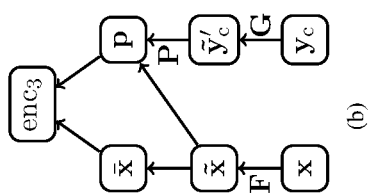
FIG. 10 is a schematic diagram illustrating an example of a network diagram for the attention-based encoder enc3 and the corresponding forward equations for section (b), in accordance with aspects of the disclosure.

FIG. 10 illustrates a network diagram for the attention-based encoder enc3 and the corresponding forward equations for section (b) (EQ #4).

Here, in FIG. 10,

F∈RD*V is the embedding of the input;

G∈RD*V is an embedding of the (output) context;

P∈RH*(CD) is a new weight matrix parameter mapping between the context embedding and input embedding; and Q is a smoothing window.

The major part in this attention-based encoder is to learn a soft alignment P, between the input X and the output Y. The soft alignment is then used to weight the smoothed version of the input x when constructing the representation. For instance, if current context aligns well with position I then the words xi−Q, . . . , xi+Q are highly weighted by the encoder.

The negative log-likelihood is used as target function during training:

$$NLL(\theta) = -\sum_{j=1}^{J} \log p(y^{(j)}|x^{(j)};\theta),$$    EQ #5

$$= -\sum_{j=1}^{J}\sum_{i=1}^{N-1} \log p(y_{i+1}^{(j)}|x^{(j)}, y_c; \theta).$$

We minimize NLL by using mini-batch stochastic gradient descent.

After training the model with large-scale document-headline data, we come to the decoding process. We use a beam-search decoder which maintains the full vocabulary V from the vocabulary index 118, while limiting itself to K potential hypotheses at each position of the summary.

$$y^* = \mathrm{argmax}_{y \in \gamma} \sum_{i=0}^{N-1} g(y_{i+1}, x, y_c).$$    EQ #6

The sentiment system 114, also referred to herein as the sentiment analysis system or sentiment analysis classifier, collects the current user query 130 and the one or more context sentences 128 from context summary system 112. In some aspects, the sentiment system 114 of the chat bot 100 collect the current user query 130 from the client computing device 104. In other aspects, the sentiment system 114 collects the user query 130 from the context summary system 112.

The sentiment system 114 analyzes the one or more context sentences 128 from the context summary system 112 to determine an emotion for each context sentence 128. In some aspects, the sentiment system 114 determines if the emotion of a context sentence 128 is positive or negative. In other aspects, the sentiment system 114 determines if the emotion for a context sentence 128 is positive, negative, or neutral. The sentiment system 114 receives the text input of the context summary system 112 and outputs an emotion label 129 for each context sentence 128 that is representative of the emotion of the user 102 for that sentence. The emotion label 129 may be assigned utilizing a simple heuristic rule so that a positive emotion for context sentence 128 receives a score or emotion label of 2, a neutral context sentence 128 receives a score or label or 1, and a negative context sentence 128 receives an emotion label or score of −1. A context sentence 128 with an assigned emotion label 129 may be referred to herein as a labeled context sentence. The sentiment system 114 identifies an emotion label 129 by utilizing one or more the following features:

Word ngrams: unigrams and bigrams for words in the text input;

Character ngrams: for each word in the text, character ngrams are extracted, for example, 4-grams and 5-grams may be utilized;

Word skip-grams: for all the trigrams and 4-grams in the text, one of the words is replaced by * to indicate the presence of non-contiguous words;

Brown cluster ngrams: brown clusters are utilized to represent words (in text), and extract unigrams and bigrams as features;

Part-of-speech (POS) tags: the presence or absence of part-of-speech tags are used as binary features;

Lexicons: the English wordnet Sentiment Lexicon may be utilized;

Social network related words: number (in text) of hashtags, emoticons, elongated words, and punctuations are may also be utilized; and Word2vec cluster ngrams: Word2vec tool may be utilized to learn 100-dimensional word embedding from a social network dataset, next a K-means algorithm and L2 distance of word vectors is employed to cluster the million-level vocabulary into 200 classes that represent generalized words in the text.

A multiple class support vector machine (SVM) model is trained utilizing these features to determine the sentiment of each context sentence 128. In some aspects, the sentiment system 114 may also utilize sound-based sentiment analysis for any received recorded voice of the applicant to judge how positive the applicant is during a context sentence 128.

The response prediction system 116 collects the current query 130, the one or more context sentences 128, and the emotion label 129. In some aspects, the response prediction system 116 collects the current query 130 from the client computing device 104. In other aspects, response prediction system 116 collects the current query 130 and/or the one or more labeled context sentences from the sentiment system 114 or the context summary system 112.

The response prediction system 116 selects one or more result responses 132 from the response database 120. The response database 120 is one or more databases 109 that store one or more responses and/or labeled response. In some aspects, the response database 120 is one or more databases 109 that store knowledge graphs of one or more responses and/or labeled response with identified contexts. The response 132 may be a comment, question, or any other suitable output for responding to a user query 130. The response prediction system 116 assigns a relevancy score to each response listed in the response database 120 based on the current query 130 and the labeled 129 context sentences 128. The relevancy score is based on the semantic similarity between a stored response and/or a stored labeled response and the query and the one or more labeled context sentences. In some aspects, the response prediction system 116 select a predetermined number of responses from the response database 120 based on the highest relevancy scores and then randomly selects one or more result responses from the predetermined number of responses. In other aspects, the response prediction system 116 select one or more result responses 132 from the response database 120 based on the highest relevancy scores.

In some aspects the response prediction system 116 selects one or more result responses from the response database 120 utilizing a response prediction model. In further aspects, the response prediction model utilizes a deep semantic similarity model and a recurrent neural network with gated recurrent units to select the one or more responses from the response database 120.

For example, the deep semantic similarity model may include a language model for information retrieval. Given a user query q and a chat bot response (or, answer) Q, the feature measures the relevance between q and Q through:

$$P(q|Q) = \prod_{w \in q} [(1-\lambda)P_{ml}(w|Q) + \lambda P_{ml}(w|C)], \quad \text{EQ \#7}$$

where $P_{ml}(w|Q)$ represents the maximum likelihood of term w estimated from Q, and $P_{ml}(w|C)$ is a smoothing item that is calculated as the maximum likelihood estimation in a large-scale corpus C. The smoothing item avoids zero probability, which stems from the terms appearing in the user response but not in the question. $\lambda \in (0, 1)$ is a parameter that acts as a trade-off between the likelihood and the smoothing item. This feature performs well when there is a great deal of overlap between a user query and a chat bot response, but when the two present similar meanings with different words, this feature fails to capture their similarity.

The answer similarity model also includes translation-based language models. These models learn term-term and phrase-phrase translation probability from question-description or query-response pairs and incorporating the information into maximum likelihood. Given a user query q and a chat bot response Q, translation-based language is defined as:

$$P_{trb}(q|Q) = \prod_{w \in q} [(1-\lambda)P_{mx}(w|Q) + \lambda P_{ml}(w|C)], \quad \text{EQ \#8}$$

Where $$P_{mx}(w|Q) = \alpha P_{ml}(w|Q) + \beta P_{tr}(w|Q) \quad \text{EQ \#9}$$

$$P_{tr}(w|Q) = \sum_{v \in Q} P_{tp}(w|v)P_{ml}(v|Q). \quad \text{EQ \#10}$$

Here $\lambda$, $\alpha$, and $\beta$ are parameters satisfying $\alpha+\beta=1$. $P_{tp}(w|v)$ represents the translation probability from term v in Q to term w in q. The answer similarity model edits distance of character/word level unigrams between queries 130 and responses 132. Further, the answer similarity model determines the maximum subsequence ratio between query 130 and response 132. Additionally, the answer similarity model determines emotion label similarity between a query 130 and a response in the response database 120.

Figure 11A:
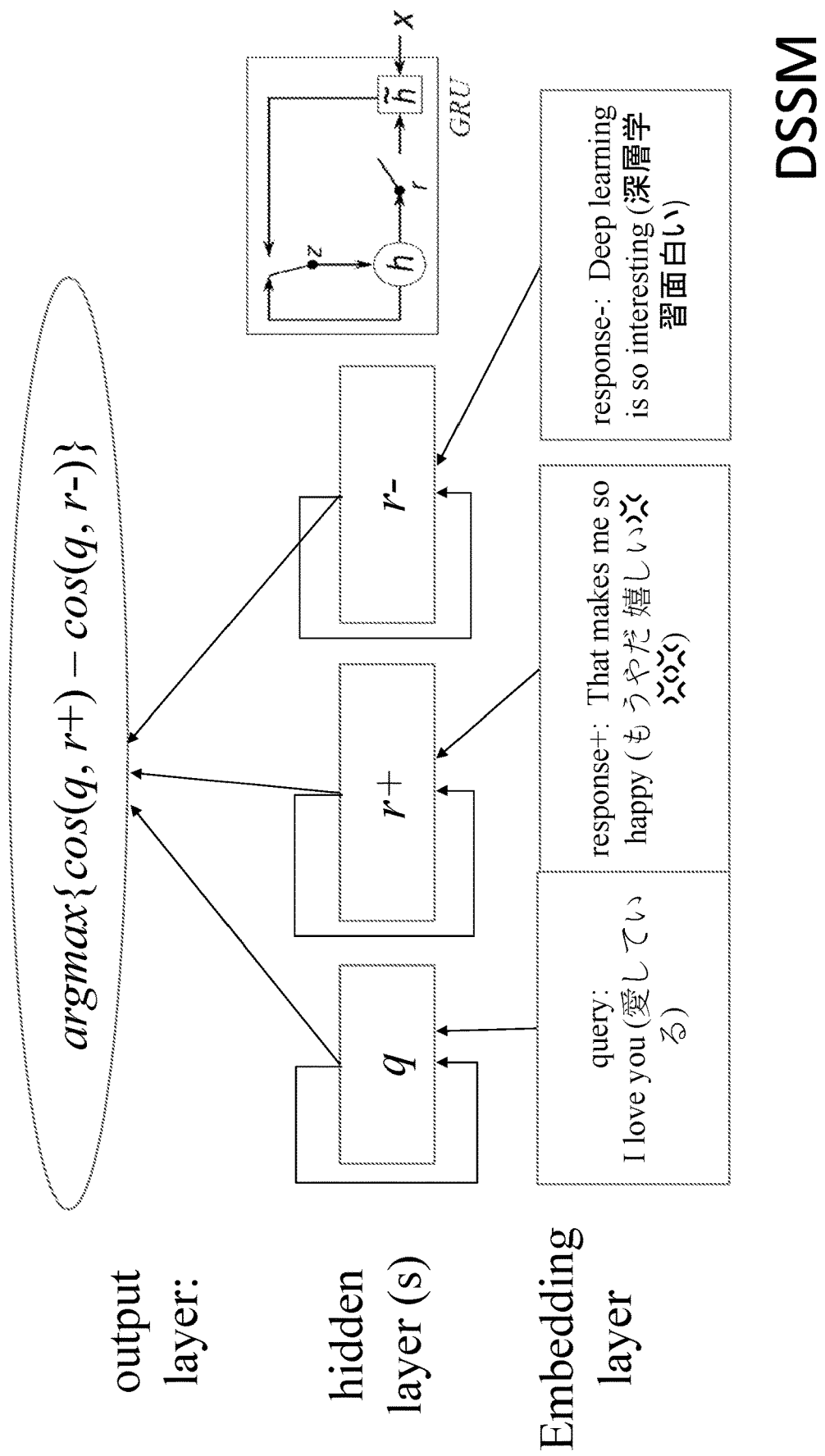
FIG. 11A is a schematic diagram illustrating an example of a recurrent neural network with gated recurrent units to learn the similarity among a user query and chat bot response, in accordance with aspects of the disclosure.

A recurrent neural network (RNN) with gated recurrent units (GRUs) to learn the similarity among a query and good/bad responses as illustrated in FIG. 11A. In FIG. 11A, one training sample includes three elements: query; good response; and bad response. For example, a query of, "I love you", a good response of "that makes me feel so happy", and a bad response of, "deep learning is interesting," is listed in FIG. 11A. The embedding layer maps these input one-hot expressions into dense vector representations. Then the hidden layer will further make use of GRU to compute the sequence level representations for the query and two responses. The output layer will compute the margin between the similarity of <query, response+> and <query, response−>. The benefit of this network is that a sparse space of variant sentences can be projected into some dense spaces and then some vector-based computing can be performed to simply compute the "similarity" among queries as well as responses.

Figure 11B:
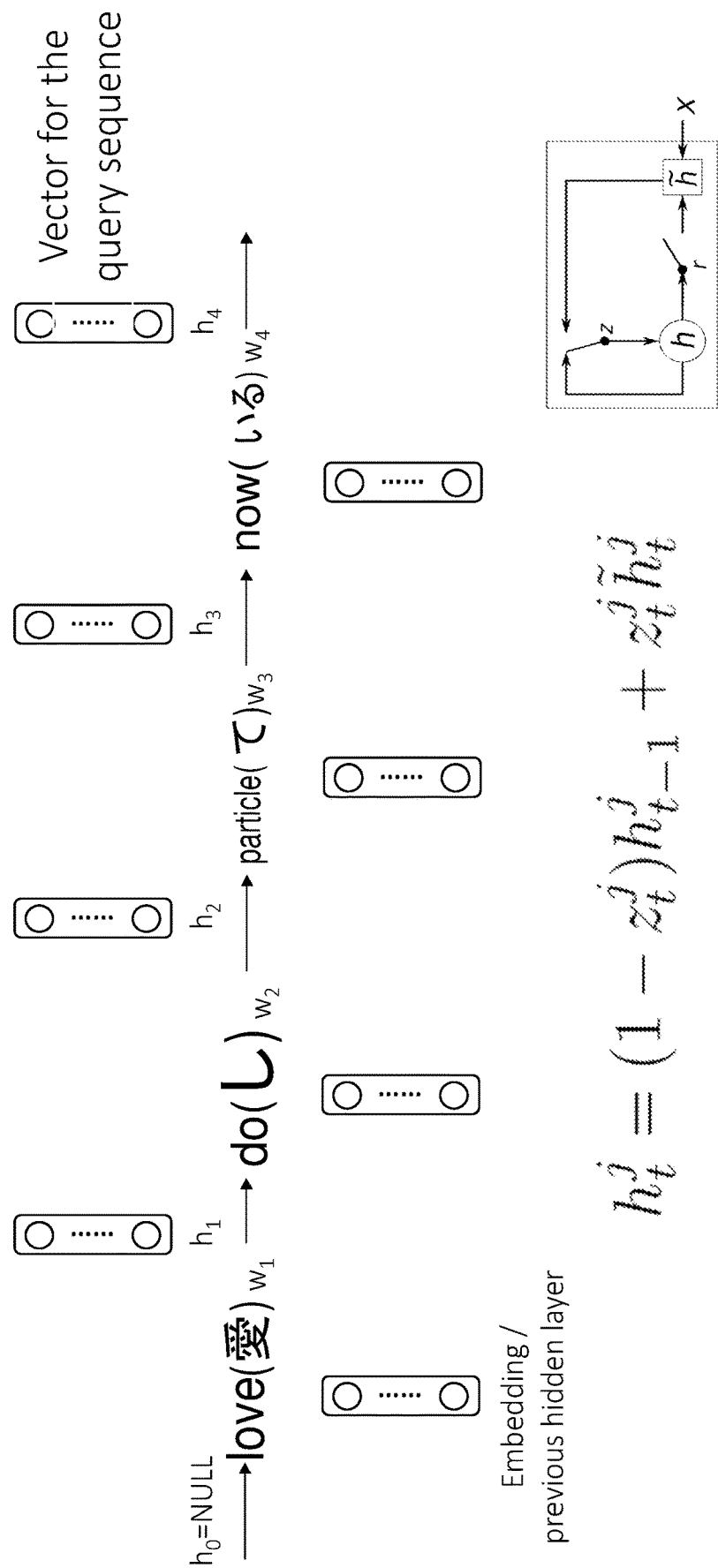
FIG. 11B is a schematic diagram illustrating an example of a left-to-right expedition of the query sequence by the GRU formula of FIG. 17A for the forward process, in accordance with aspects of the disclosure.
Figure 11C:
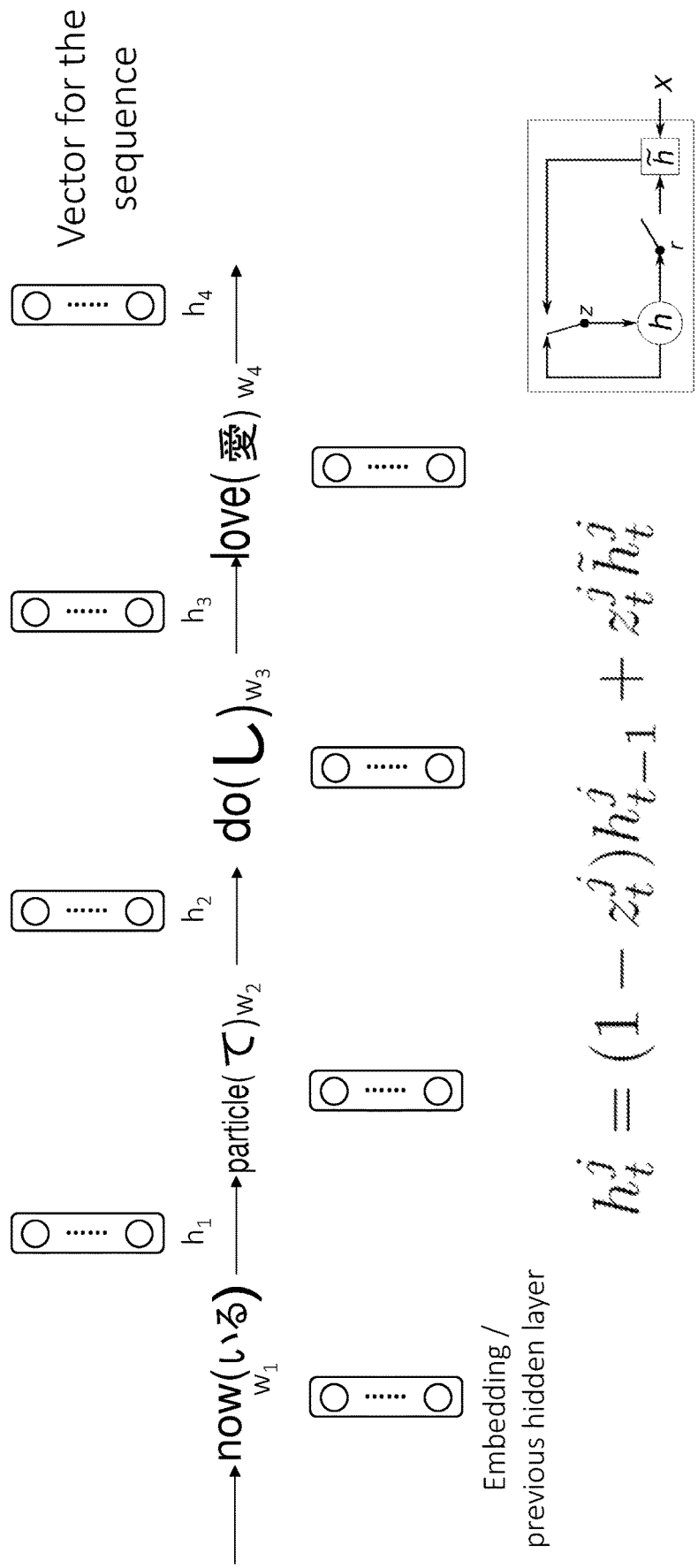
FIG. 11C is a schematic diagram illustrating an example of a right-to-left expedition of the query sequence by using GRU formula shown in FIG. 11A for the forward process, in accordance with aspects of the disclosure.
Figure 11D:
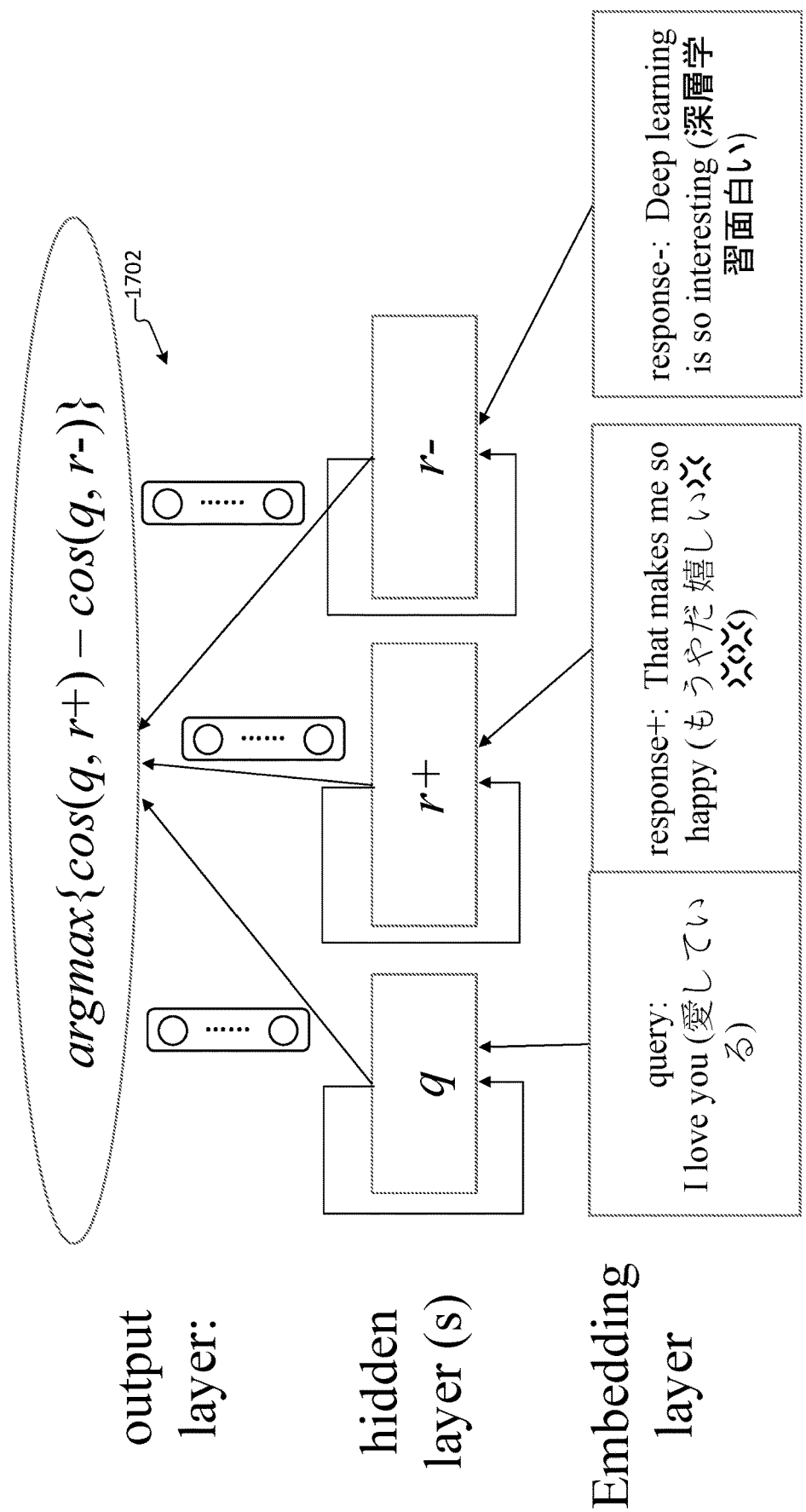
FIG. 11D is a schematic diagram illustrating an example of an output layer, which takes the connection of the two vectors (left-to-right and right-to-left) from FIG. 17B as input and computes the margin, in accordance with aspects of the disclosure.

With large-margin training, the embedding matrices from words to vectors, and the transform matrices from embedding vectors to hidden layer lower-dimension vectors can be obtained. When these matrices are obtained, the testing process can be then performed. Given a query and a corresponding chat bot response, the training can go through the network to compute the similarity of the query and the response to obtain a similarity score. FIG. 11B illustrates a left-to-right expedition of the query sequence by using GRU formula shown in FIG. 11A for the forward process. FIG. 11C illustrates a right-to-left expedition of the query sequence by using GRU formula shown in FIG. 11A for the forward process. For example, Japanese is a subject-object-verb (SOV) language and the semantic meaning of the sequence cannot be determined until looking at the total sequence because the predicate is mostly located in the right-hand-side of the whole sequence. Thus, it is important to compute the vector of sequence in a right-to-left order in addition to the left-to-right manner. FIG. 11D illustrates an output layer 1102, which takes the connection of the two vectors (left-to-right and right-to-left) as input and computes the margin. The error (if the similarity of <q, a+> is smaller than the similarity of <q, a−>, the distance is taken as error) will be back propagated from output layer and then hidden layer and finally the embedding layer.

Next, the response prediction system 116 analyzes the calculated relevance scores and selects one or more responses from the response database 120 based on the responses with the highest scores. In some aspect, the response prediction system 116 selects a predetermine number of responses. The predetermined number may be configured by the creator of the chat bot 100 and/or selected by the user of the chat bot 100. As discussed above, in some aspects the one or more result response are chosen at random from the predetermine number of selected responses from the response database 120. In other aspects, the predetermined number of responses are the one or more result response. As discussed above, the core worker 111 may collect the one or more result responses from the response prediction system 116 and reconfigure the response if necessary before providing the response to the user in reply to the user query.

The chat bot 100 also includes a feedback system 119. The feedback system 119 utilizes user feedback and/or world feedback 122 to train or update the context summary system 112, the sentiment system 114, and/or the response prediction system 116. In some aspects, the feedback system 119 utilizes user feedback and/or world feedback 122 to train the context summary model, the sentiment analysis model, and the response prediction model.

In some aspects, the feedback system 119 collects world feedback 122 via a network 113. The world feedback 122 may include queries and corresponding responses from other users of the chat bot 100 that can be utilized as positive or negative training data for the context summary system 112, the sentiment system 114, and/or the response prediction system 116 for the chat bot 100. In some aspects, the world feedback 122 may include queries and corresponding responses from other users of their chat bot that can be utilized as positive or negative training data for the response prediction system 116 for the user's 102 chat bot 100.

In other aspects, the feedback system 119 collects user answers from the user in reply to a previously provided result responses. The feedback system 119 analyzes the answer to determine user feedback for the result response. The feedback system 119 utilizes the determined user feedback as positive or negative training data for the context summary system 112, the sentiment system 114, and/or the response prediction system 116. In some aspects, the user feedback determined by the feedback system 119 for the result response is based on a judgment in the answer. The feedback system 119 may analyze the answer to determine the judgment.

In order to determine the judgment in the answer, the feedback system 119 first assigns an emotion label to the answer utilizing the sentiment analysis system 114. Further, feedback system 119 determines one or more contexts of the answer utilizing the context summary system 112 and then determines a similarity between the one or more contexts of the answer and the one or more contexts of the query. The feedback system 119 determines a judgment for the answer based on the answer emotion label and the context similarity. Typically, a negative emotion and/or a low context similarity will be utilized as negative training data, while a high context similarity and/or positive emotion will be utilized as positive training. For example, a judgment is positive (or may be utilized as positive or reinforcing training data) when the emotional label is positive and the context similarity is high. In another example, a judgment is negative (or may be utilized as negative or discouraging training data) when the emotional label is neutral or negative and the context similarity is low. In another example, the judgment is negative (or may be utilized as negative or discouraging training data) when the emotional label is negative and the similarity is high. In an alternative example, the judgment is positive (or may be utilized as positive or reinforcing training data) when the emotional label is negative and the similarity is high. In other examples, the judgment is neutral when the emotional label is neutral and the similarity is neither high nor low. As such, in some aspects, the feedback system 119 does not determine any user feedback based on the analysis of a user answer to a chat bot response. The parameters or thresholds for determining when a judgment is positive or negative may be set or configured by the creator of the chat bot 100.

If the feedback system 119 determines user feedback based on the answer, the feedback system 119 will send the user feedback to the appropriate system as training data. In some aspects, the context summary system 112 collects contexts and headlines associated with prior chat bot responses and user answers for training or updating. In other aspects, the sentiment system 114 collects user queries and the queries corresponding labeled sentences associated with chat bot responses and user answers for training or updating. In further aspects, the response prediction system 116 collects user queries and corresponding chat bot responses for training or updating.

For example, FIGS. 3A and 3B show how a chat bot 100 can utilize user feedback to provide better responses 132 the next time a similar or the same query 130 is received form a user 102. FIG. 3A illustrate a screen shot of a user interface of the user's client computing device 104 during a conversation with an emotionally intelligent AI chat bot 100. In FIG. 3A the chat bot 100 misunderstands that the user is referring to "sports" instead of "like". The answer "you misunderstand" is evaluated by the user feedback system to determine that the user's answer is negative and not similar to the chat bot's response. However, the user's answer regarding "sports" in FIG. 3A is answered by the user with positive emotion. The user feedback system 119 utilized the responses and answer to train or update the context summary system 112, the sentiment system 114, and/or the response prediction system 116.

FIG. 3B is a schematic diagram illustrating a screen shot of a user interface of the user's client computing device 104 during a conversation with the emotionally intelligent AI chat bot 100 after being trained based on user feedback from the conversation illustrated in FIG. 3A. In this example, the chat bot 100 knows instantly that the user query reciting, "Rinna what kind of sports do you like?" is referring to "sports" and not "like." As such, the chat bot 100 is able to provide better answers that are met with positive answers from the user, which may be utilized by the feedback system further reinforce this response pattern by the chat bot 100.

FIGS. 4A-4D illustrate a flow diagram conceptually illustrating an example of a method 400 for emotionally intelligent automated chatting. In some aspects, method 400 is performed by an application, such as the chat bot 100 described above. Method 400 provides emotionally intelligent automated chatting by determining a context and an emotion of a conversation with a user. Based on these determinations, the method 400 can select one or more responses from a database of responses to a reply to a user query. As such, method 400 performs emotionally intelligent automated chatting that is more effective, more engaging, easier to use, and more lifelike than previously utilized chat bots that were not able to select responses based on the conversation context and emotion.

Method 400 starts at operation 402. At operation 402, a user query is collected. The user query may be provided in one or more different inputs, such as video, voice, images, and/or texts. In some aspects, at operation 402 the query is processed or converted into text. In some aspects, a LU system with one or more different APIs is utilized to convert the received user query into text and/or annotated text.

At operation 404, the user query and/or one or more previous turns of the conversation are analyzed to determine one or more context sentences. Context sentences as utilized herein refer to a sentence that summaries the context of the conversation between the user and the application performing method 400. A turn of a conversation as utilized herein refers to every back in forth in the conversation between the user and the application performing method 400. As such, a turn refers to a user query or a turn refers to a response provided to the user via the application running method 400. A user answer is a user query that was collected in reply to a response provided to the user by method 400. As utilized herein, a collection refers to any user query and/or any response provided to the user by the application running method 400. In some aspects, the collection is the current user query and one or more previously received user queries. In other aspect, the collection is just the current user query. In further aspects, the collection is the current user query, one or more previously collected user queries, and one or more responses previously provided to the user by the application running method 400. If the user query is determined to be an answer at operation 404, then operation 416 is performed. If the user query is determined not to be an answer at operation 404, then operation 406 is performed.

Figure 4A:
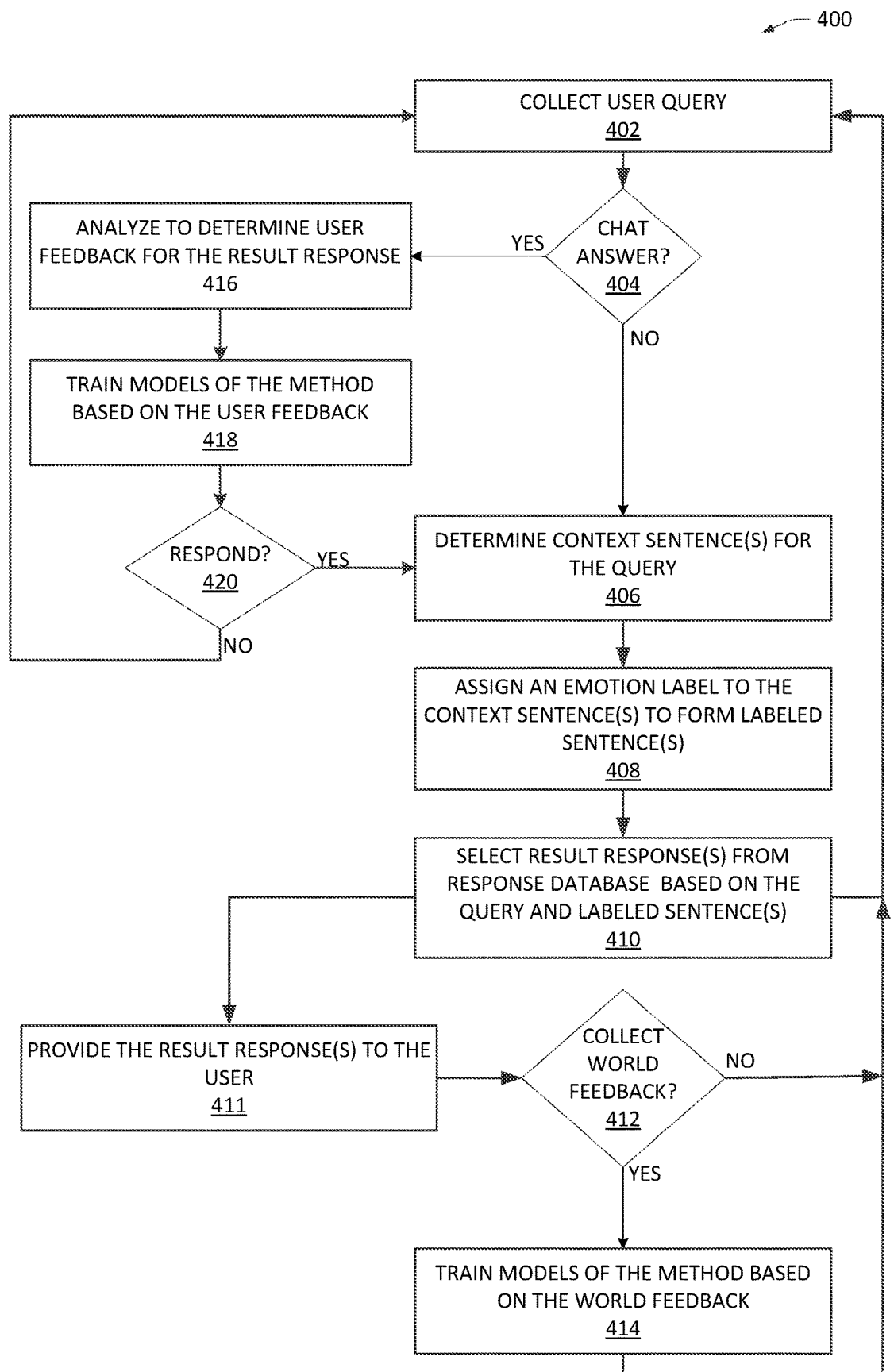
FIG. 4A is a block flow diagram illustrating a method for emotionally intelligent automated chatting, in accordance with aspects of the disclosure.
Figure 4B:
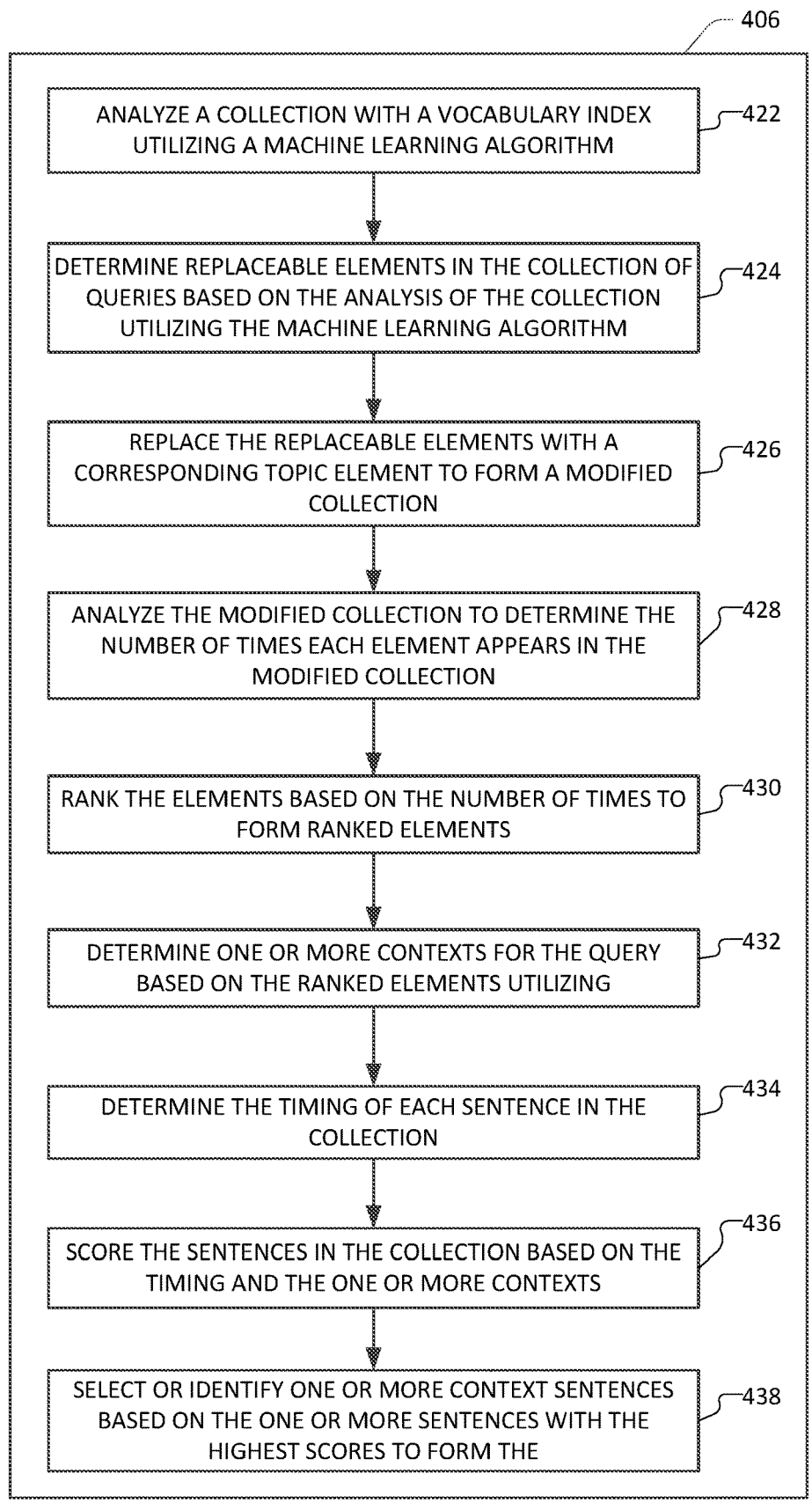
FIG. 4B is a block flow diagram illustrating a method for performing operation 406 of the method shown in FIG. 4A, in accordance with aspects of the disclosure.

At operation 406, one or more context sentences for the collection are determined. In some aspects, operation 406 is performed by the context summary system 112 described above. FIG. 4B illustrates an example of a method for performing operation 406. In some aspects, operation 406 includes operations 422, 424, 426, 428, 430, 432, 434, 436, and 438 as illustrated by FIG. 4B.

At operation 422, a collection is analyzed with a vocabulary index utilizing a machine learning algorithm. At operation 424, one or more replaceable elements in the collection are determined based on the analysis performed by operation 422. Elements as utilized herein referred to words, abbreviation, and/or phrases.

In some aspects, operations 426, 428, 430, 432, 434, 436, and/or 438 are performed utilizing a vector system and a feed-forward neural network language model. At operation 426, the one or more replaceable elements are replaced with corresponding topic elements to form a modified collection. The modified collection includes any elements that were not replaced during operation 426 and any inserted corresponding topic elements. The term element as utilized herein includes the corresponding topic elements. Next, at operation 428, the elements in the modified collection are analyzed to determine the number of times each element appears in the modified collection. At operation 430 the elements are ranked based on the number of times each of the elements appears in the modified collection to form the ranked elements.

After the performance of operation 430, operation 432 is performed. One or more contexts are determined based on the ranked elements at operation 432. In some aspects, a set number of contexts are determined based on the ranked elements. In other aspects, the one or more contexts are any contexts that meet or exceed a predetermined threshold. The set number and/or the threshold may be configured by the creator of the application performing method 400 and/or selected by the user of the application performing method 400. Elements with more instances are ranked higher than elements with fewer instances. As such, elements with the highest ranking may be selected as the one or more contexts.

The timing of each sentence and/or context for each sentence in the modified collection is identified or determined at operation 434. The timing indicates how recently a sentence and/or context was collected at method 400. The more recent the timing of a sentence and/or context, the more likely the context and/or sentence is relevant to the conversation.

After operations 432 and 434, operation 436 is performed. At operation 436, the one or more sentences in the modified collection are scored based on the one or more contexts and the timing. Sentences with more instances of the one or more contexts and/or with more recent timing are scored above sentences with less instances of the one more contexts and/or with less recent timing.

At operation 438, one or more context sentences are identified, selected or determined based on the one or more sentences with the highest scores. In some aspects, the one or more sentences are paraphrased and/or combined to form a context sentence. A context sentence may also be referred to as a headline herein. In some aspects, a predetermined number of contexts sentences are identified at operation 438. In other aspects, the one or more contexts sentences are formed based on any sentences in the modified collection that meet or exceed a predetermined threshold. The predetermined number and/or the threshold may be configured by the creator of the application performing method 400 and/or selected by the user of the application performing method 400.

Figure 4C:
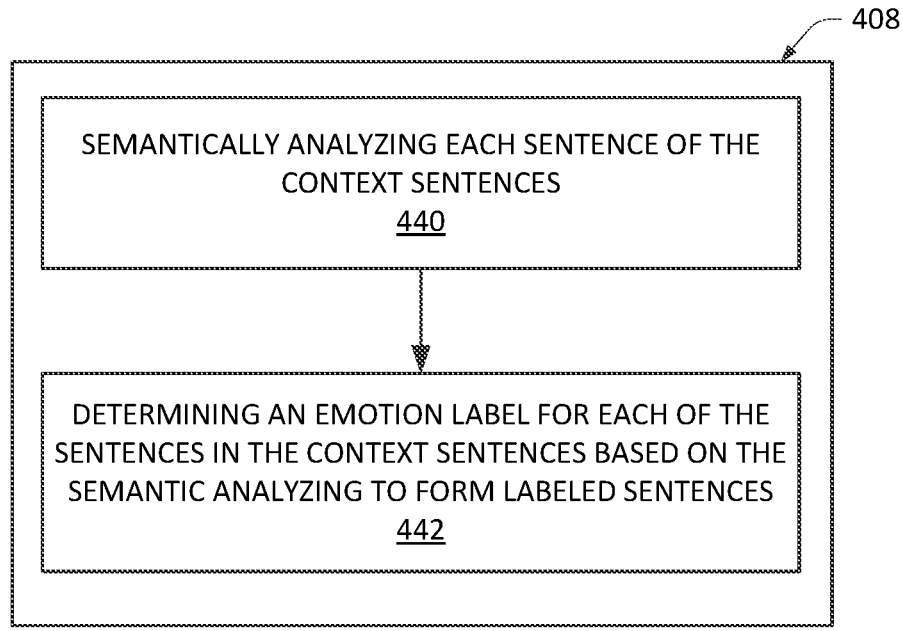
FIG. 4C is a block flow diagram illustrating a method for performing operation 408 of the method shown in FIG. 4A, in accordance with aspects of the disclosure.

After the performance of operation 406, operation 408 is performed. In some aspects, operation 408 is performed by the sentiment system 114 disclosed above. FIG. 4C illustrates an example of a method for performing of operation 408 during method 400. Operation 408 may include operations 440 and 442 as illustrated in FIG. 4C. At operation 408, an emotion label is assigned to every sentence in the one or more context sentences. At operation 440 each sentence in the one or more context sentences is semantically evaluated or analyzed. In some aspects, voice data and/or text data from the user's query are evaluated to determine the emotion of the user during the query. In further aspects, the each sentence is analyzed utilizing a multiple class vector support machine at operation 440. Next, at operation 442, an emotion label for each sentence in the one or more context sentences is identified and assigned based the semantic analyzing performed at operation 440 to form labeled sentences. In some aspects, the emotion label is positive or negative. In other aspects, the emotion label is positive, negative, or neutral. In further aspects, a user's text answer is evaluated utilizing a multiple class vector support machine trained utilizing word ngrams, character ngrams, word skip-grams, brown cluster ngrams, part-of-speech tags, lexicons, social network related words, and/or word2vec cluster ngrams to identify the emotion label for each context sentence at operation 408.

Figure 4D:
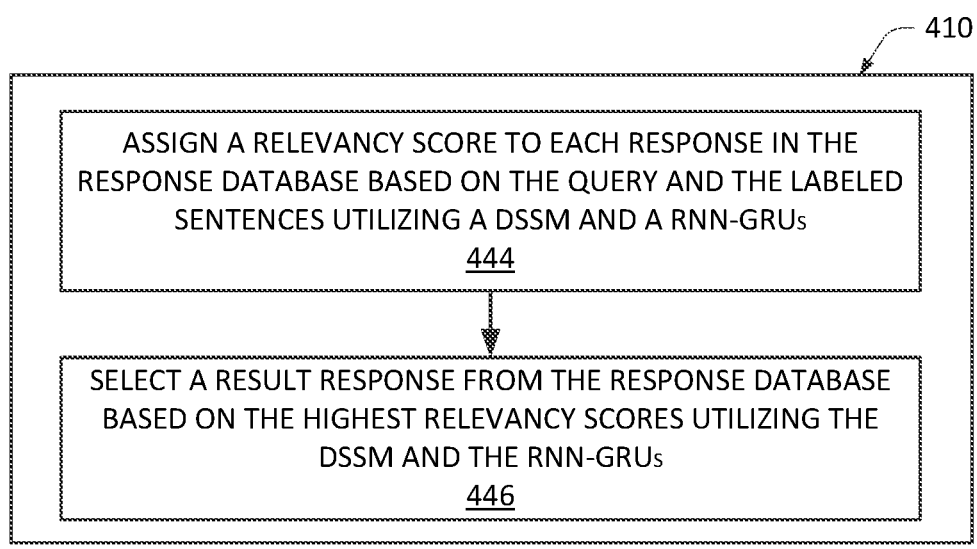
FIG. 4D is a block flow diagram illustrating a method for performing operation 410 of the method shown in FIG. 4A, in accordance with aspects of the disclosure.

At operation 410, one or more result responses are selected from a database of responses based on the current user query and the labeled sentences. In some aspects, method 410 is performed by the response prediction system 116 disclosed above. In further aspects, method 410 is performed utilizing a deep semantic similarity model (DSSM) and a recurrent neural network with gated recurrent units (RNN-GRUs). FIG. 4D illustrates an example of a method for performing operation 410. Operation 410 may include operations 444 and 446 as illustrated in FIG. 4D. At operation 444, a relevancy score is assigned to each response in the response database based on the current query and the labeled sentences. Responses in the response database with high semantic similarity to the current user query and/or to the labeled context sentences are assigned higher scores than responses in the response database that have low semantic similarity to the current user query and/or to the labeled context sentences. As such, the emotion labels of the labeled sentences are compared to the stored emotion labels for the stored responses on the response database at operation 410 to determine the stored responses with the most similarity to the current user query and labeled sentences.

Next, at operation 446 one or more result responses are selected based on the relevancy scores. In some aspects, the one or more result responses are the responses in the response database with the highest relevancy scores at operation 446. In alternative aspects, at operation 446, a predetermined number of responses are selected from the response database based on the highest relevancy scores. Next, at operation 446 in these aspects, the one or more result responses are selected at random from the predetermined number of responses selected from the results database. The predetermined number of responses or number of selected result responses may be determined by the creator of the application performing method 400 or may be selected by the user of the application running method 400. In other aspects, the predetermined number of responses or number of selected result responses may be any response that meets a predetermine relevancy score threshold that configured by the creator and/or selected by the user.

In response to the one or more result responses being selected at operation 410, operation 411 is performed. At operation 411 the one or more result response are provided to the user in reply to the query. In some aspects, the one or more result responses are provided by a client computing device to the user at operation 411. In other aspects, instructions are sent to the client computing device to provide the one or more result responses to the user at operation 411. The client computing device provides the one or more result response utilizing any known visual, audio, tactile, and/or other sensory mechanisms at operation 411. For example, the client computing device may provide the one or more result responses with an artificial voice speaking through speakers on the client computing device.

In some aspects, method 400 includes operations 412 and 414. At operation 412 a determination is made whether or not world feedback has been collected. If world feedback has not been collected at operation 412, then operation 402 is performed again or method 400 ends. If world feedback has been collected at operation 412, then operation 414 is performed. At operation 414, the world feedback is sent to one or more models utilized by method 400 to update or train those models based on the world feedback. For example, a user query and corresponding response pair from the world feedback may be sent to train the response prediction model. After the performance of operation 414, operation 402 may performed again or method 400 may end.

At operation 416, a user answer is evaluated or analyzed to determine user feedback for one or more previously sent result responses. In some aspects, the user answer is evaluated to determine a judgment of the one or more previously sent result responses that is provided in the user answer. In order to determine the judgment in the answer at operation 416, an emotion label is assigned to the answer utilizing sentiment analysis. Further at operation 416, one or more contexts of the answer are identified utilizing the context summary model and then a similarity between the one or more contexts of the answer and the one or more contexts of the answer are determined. The judgment for the answer determined at operation 416 is based on the answer emotion label and the context similarity. Typically, a negative emotion and/or a low context similarity will be utilized as negative training data, while a high context similarity and/or positive emotion will be utilized as positive training. In some aspects at operation 416, user feedback cannot be determined from the user answer. In these aspects, no feedback is sent to operation 418 for training and operation 420 is performed.

At operation 418, the determined user feedback from operation 416 is sent to one or models utilized during method 400 to train or update these models. This training allows method 400 to improve or increase response accuracy for the given user each time method 400 is utilized.

After operations 416 and/or operation 418, operation 420 is performed. At operation 420, a determination is made whether a response is necessary based on the user answer. If a determination is made that a response is not necessary or not desired based on the user answer at operation 418, then operation 402 is performed again and method 400 waits to received or retrieve another user query or method 400 may end. If a determination is made that a response is necessary or desired based on the user answer at operation 418, then operation 406 is performed. For example, if the user's answer is "your welcome", there may not be a response necessary by method 400, then no result response is provided by method 400 in reply to this received answer.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
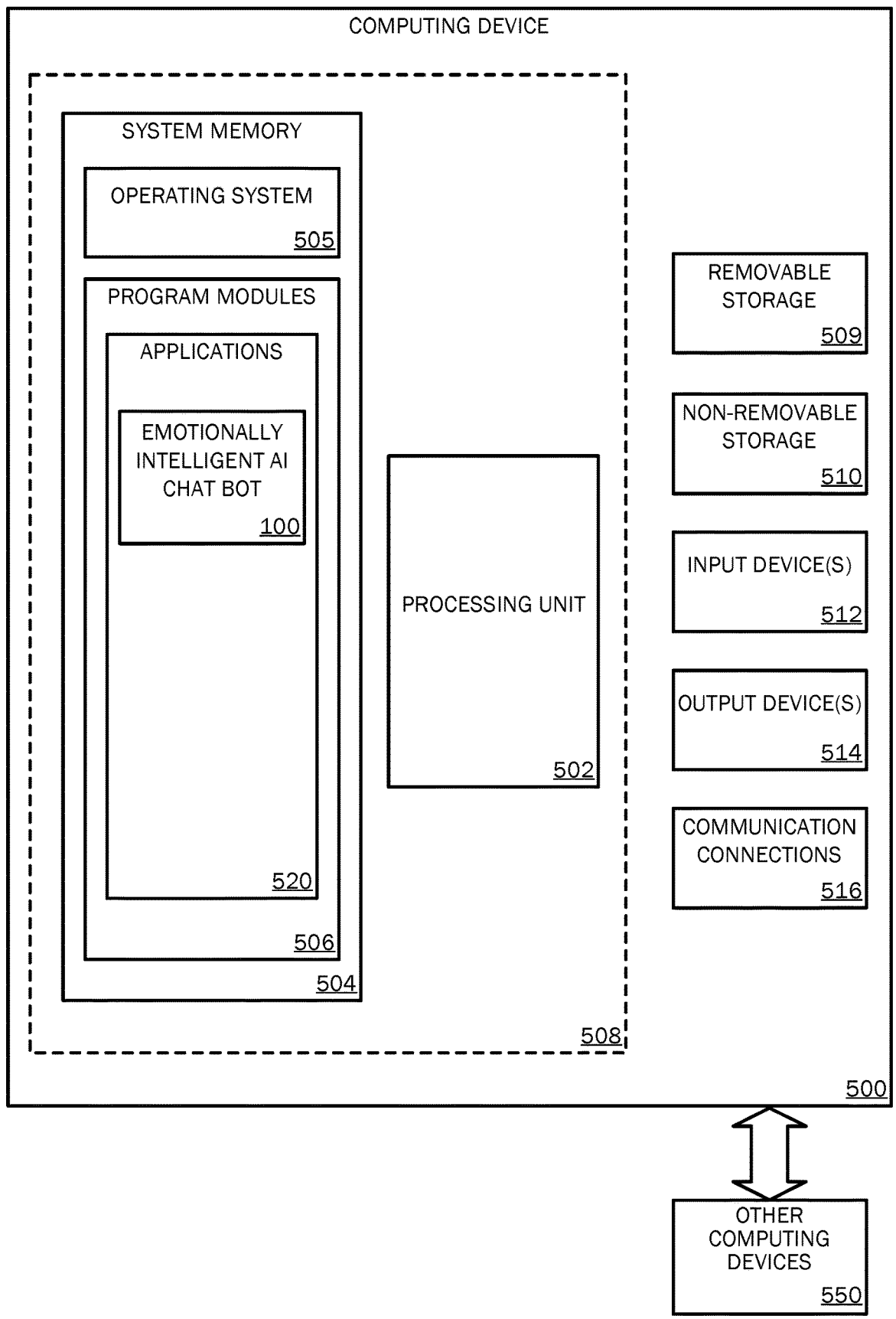
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the emotionally intelligent AI chat bot 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the chat bot 100 that can be executed to employ method 400. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., LU system 110, context summary system 112, sentiment system 114, core worker 111, feedback system 119, and/or the response prediction system 116) may perform processes including, but not limited to, performing method 400 as described herein. For example, the processing unit 502 may implement the chat bot 100, including the LU system 110, context summary system 112, sentiment system 114, response prediction system 116, core worker 111, and/or the feedback system 119. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the chat bot 100 allows a user to interact with in one or more of the above referenced applications in more effective, more efficient, and improved manner.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
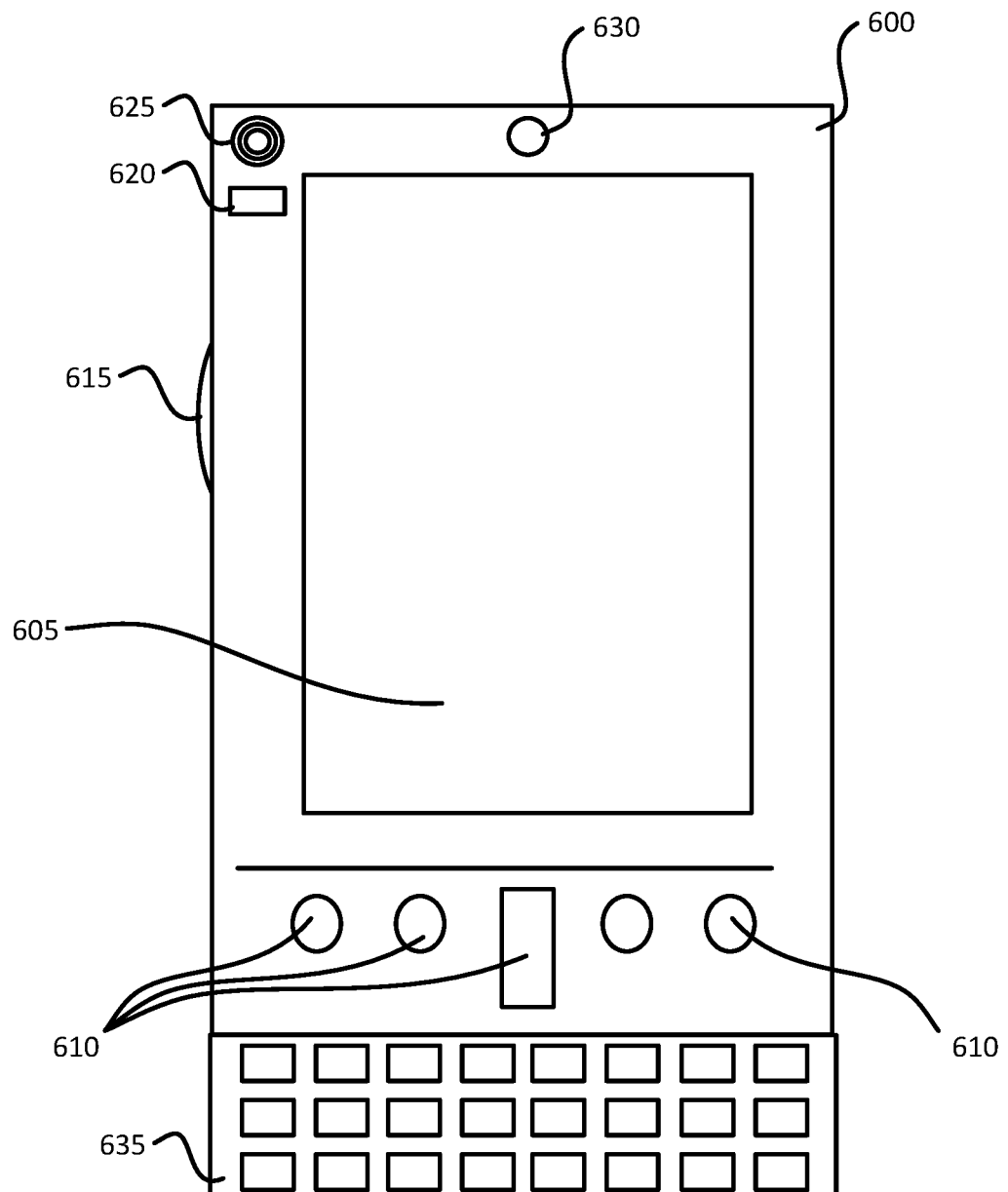
FIG. 6A is a simplified block diagram of a mobile computing device with which various aspects of the disclosure may be practiced.
Figure 6B:
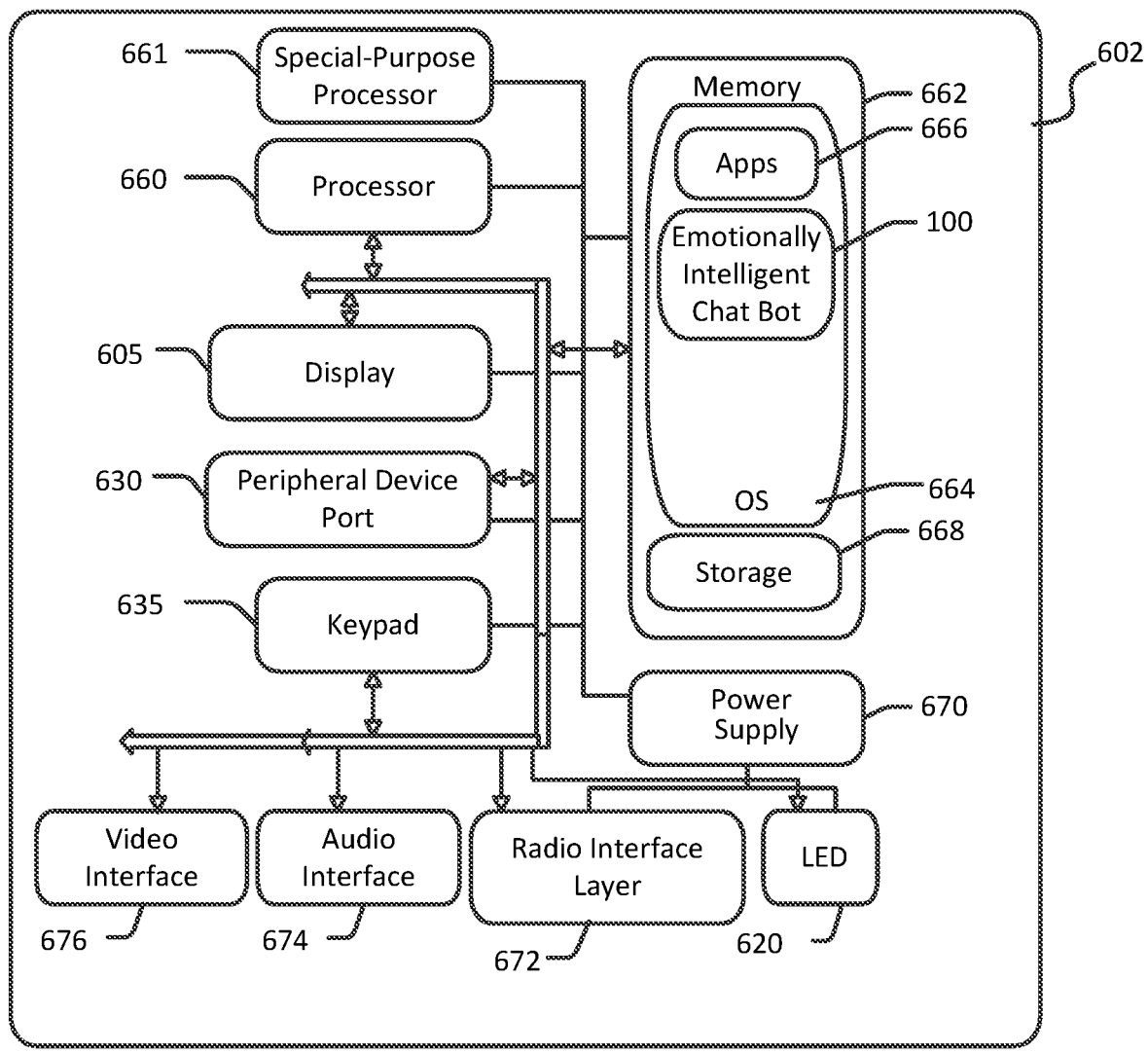
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the chat bot 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
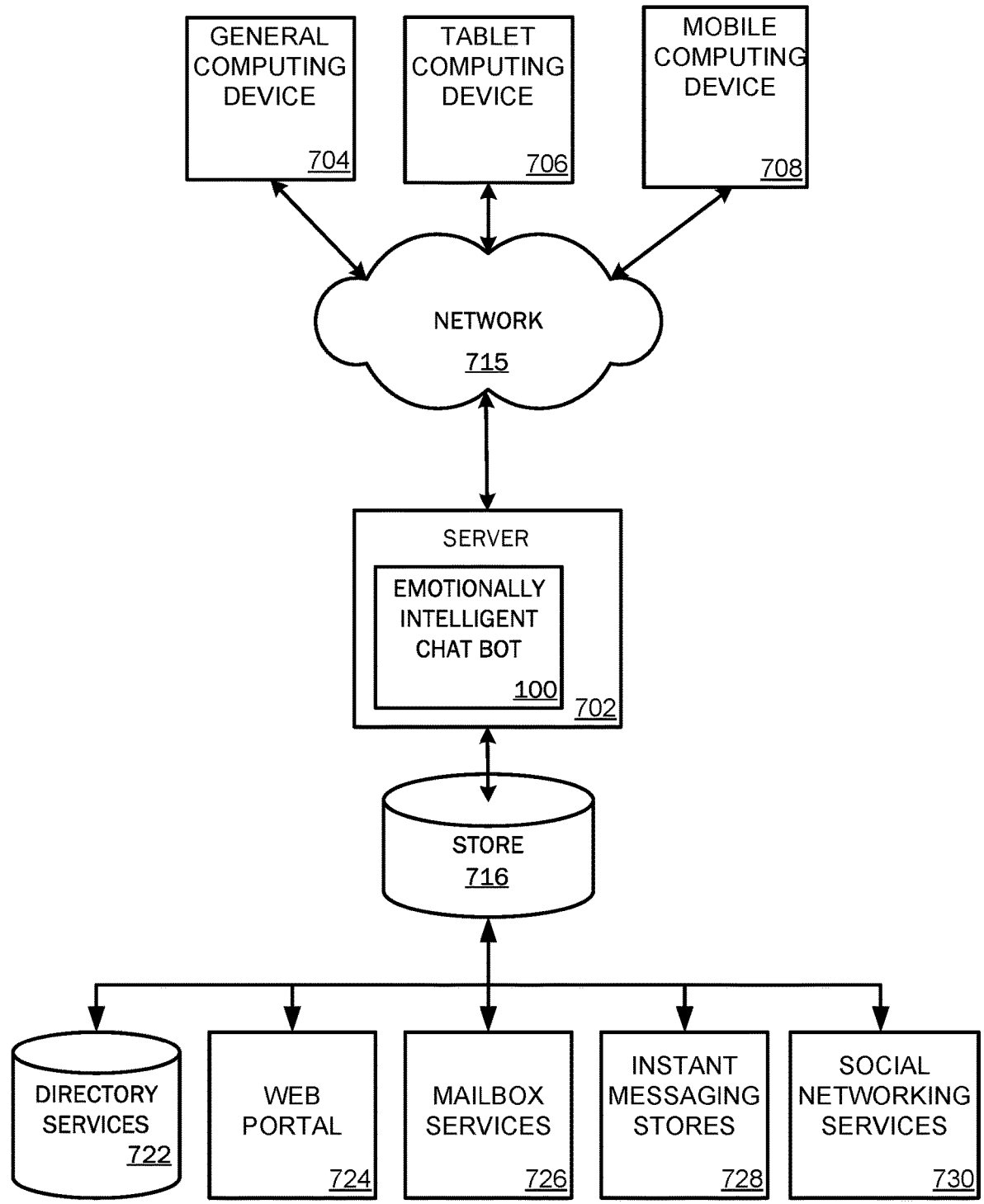
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the chat bot may be implemented in a general computing device 704, a tablet computing device 706 and/or a mobile computing device 708 (e.g., a smart phone). In some aspects, the server 702 is configured to implement a chat bot 100, via the network 715 as illustrated in FIG. 7.

Figure 8:
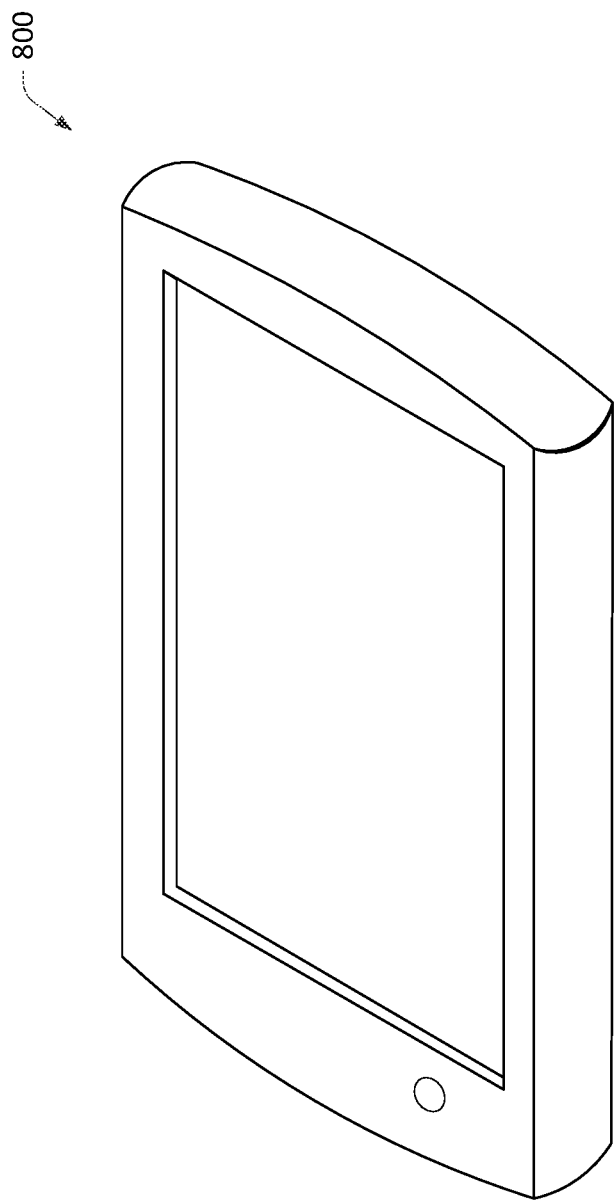
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for an emotionally intelligent chat bot, the system comprising:
    at least one processor; and
    a memory for storing and encoding computer executable instructions that, when executed by the at least one processor is operative to:
        collect a query from a user;
        responsive to collecting the query from the user:
            determine context sentences for the query utilizing a neural network and a context summary model, wherein the context summary model utilizes a vector system and a feed-forward neural network language model to determine the context sentences, and wherein determine the context sentences comprises:
                analyze a collection with a vocabulary index utilizing a machine learning algorithm, wherein the collection includes the query and at least one previously received query,
                determine replaceable elements in the collection based on the analysis of the collection,
                replace each of the replaceable elements with a corresponding topic element to form a modified collection,
                determine a frequency each element appears in the modified collection,
                rank elements in the modified collection based on the frequency to form ranked elements,
                select a set number of the highest ranked elements of the modified collection as one or more contexts,
                determine a timing of each sentence in the modified collection,
                score every sentence in the modified collection based on the timing and the one or more contexts, and
                select one or more sentences with highest scores from the modified collection to form the context sentences;
            assign an emotion label to each sentence in the context sentences utilizing a sentiment analysis model to form labeled sentences, wherein the emotion label identifies a user tone for a sentence, and wherein the sentiment analysis model utilizes a multiple class vector support machine trained utilizing at least one of word ngrams, character ngrams, word skip-grams, brown cluster ngrams, part-of-speech tags, lexicons, social network related words, and word2vec cluster ngrams to identify the emotion label;
            select a result response from a response database utilizing a response prediction model, wherein selecting the result response comprises:
                assign a relevancy score to each response in the response database based on the query and the labeled sentences,
                select a predetermined number of responses from the response database based on highest relevancy scores, and
                randomly select the result response from the predetermined number of responses, wherein the relevancy score assigned to each response and the result response are determined utilizing a deep semantic similarity model and a recurrent neural network with gated recurrent units; and provide the result response to the user in reply to the query.

2. The system of claim 1, wherein the at least one processor is operative to:
receive an answer from the user in reply to the result response;
analyze the answer to determine user feedback for the result response; and
train the context summary model, the sentiment analysis model, and the response prediction model based on the user feedback.

3. The system of claim 2, wherein the at least one processor is operative to:
collect world feedback; and
train the response prediction model based on the world feedback.

4. The system of claim 2, wherein the user feedback for the result response is based on a judgment in the answer.

5. The system of claim 4, wherein determining the judgment in the answer comprises:
assign an answer emotion label to the answer utilizing the sentiment analysis model;
determine one or more contexts of the answer utilizing the context summary model; and
determine a similarity between the one or more contexts of the answer and the one or more contexts of the query, wherein the judgment is based on the answer emotion label and the similarity.

6. The system of claim 5, wherein the judgment is positive when the emotion label is positive and the similarity is high.

7. The system of claim 5, wherein the judgment is negative when the emotion label is neutral or negative and the similarity is low.

8. The system of claim 5, wherein the judgment is negative when the emotion label is negative and the similarity is high.

9. The system of claim 1, wherein the relevancy score is based on a semantic similarity between responses located in the response database and the query and the labeled sentences.

10. The system of claim 9, wherein the relevancy score increases as the semantic similarity between a response located in the response database, and the query and the labeled sentences increases;
wherein the semantic similarity includes a comparison of the emotion label for each of the context sentences to a stored emotion label corresponding to the response on the response database.

11. A method for emotionally intelligent automated chatting, the method comprising:
collecting a query from a user;
responsive to collecting the query from the user:
determining context sentences for the query, wherein the context sentences for the query are determined utilizing a learning algorithm, a vector system, and a feed-forward neural network language model, and wherein determining the context sentences comprises:
analyzing a collection with a vocabulary index utilizing a machine learning algorithm, wherein the collection includes the query,
determining replaceable elements in the collection based on the analysis of the collection and replacing the replaceable elements with a corresponding topic element to form a modified collection,
analyzing the modified collection to determine a frequency each element appears in the modified collection,
ranking elements in the modified collection based on the frequency to form ranked elements,
selecting a set number of the highest ranked elements of the modified collection as one or more contexts,
determining a timing of each sentence in the modified collection,
scoring sentences in the modified collection based the timing and the one or more contexts, and
selecting one or more sentences from the modified collection with highest scores to form the context sentences;
semantically analyzing each sentence of the context sentences, wherein the semantic analysis is a multiple class vector support machine trained utilizing at least one of word ngrams, character ngrams, word skip-grams, brown cluster ngrams, part-of-speech tags, lexicons, social network related words, and word2vec cluster ngrams;
determining an emotion label for every sentence in the context sentences based on the semantic analyzing to form labeled sentences, wherein the emotion label identifies a user tone for a sentence;
assigning a relevancy score to each response in a response database based on the query and the labeled sentences, wherein the relevancy scores and the result response are determined utilizing a deep semantic similarity model and a recurrent neural network with gated recurrent units;
selecting a result response from the response database based on relevancy scores; and
providing the result response to the user in reply to the query.

12. The method of claim 11, further comprising:
receiving an answer from the user in reply to the result response;
analyzing the answer to determine user feedback for the result response; and
training the learning algorithm, the vector system, the feed-forward neural network language model, the multiple class vector support machine, and the deep semantic similarity model and the recurrent neural network with the gated recurrent units based on the user feedback.

13. The method of claim 11, further comprising: collecting world feedback; and training the deep semantic similarity model and the recurrent neural network with the gated recurrent units based on the world feedback.

14. The method of claim 11, wherein the collection further includes a previously received query from the user.

15. A system for providing an emotionally intelligent chat bot, the system comprising:
at least one processor; and
a memory for storing and encoding computer executable instructions that, when executed by the at least one processor, cause the at least one processor to:
collect a query from a user;
responsive to collecting the query from the user:
determining one or more context sentences for the query based at least in part on the query, wherein the context sentences for the query are determined utilizing a learning algorithm, a vector system, and a feed-forward neural network language model, and wherein determine one or more context sentences comprises:
replacing replaceable elements in a collection including the query and at least one previously received query with a corresponding topic element to form a modified collection, analyzing the modified collection to determine a frequency that elements appear in the modified collection, ranking elements in the modified collection based on the frequency to form ranked elements, selecting a set number of the highest ranked elements of the modified collection as one or more contexts, and selecting one or more sentences from the modified collection based, at least in part, on the contexts to form the context sentences;

assigning an emotion label to each sentence in the one or more context sentences utilizing a sentiment analysis model to form labeled sentences, wherein the emotion label identifies a user tone for a sentence, and wherein the sentiment analysis model utilizes a multiple class vector support machine trained utilizing at least one of word ngrams, character ngrams, word skip-grams, brown cluster ngrams, part-of-speech tags, lexicons, social network related words, and word2vec cluster ngrams to identify the emotion label;

selecting a result response from a response database based on the labeled sentences utilizing a response prediction model, wherein selecting the result response comprises:

assigning a relevancy score to each response in the response database based on the query and the labeled sentences, selecting a predetermined number of responses from the response database based on highest relevancy scores, and randomly selecting the result response from the predetermined number of responses, wherein the relevancy score assigned to each response and the result response are determined utilizing a deep semantic similarity model and a recurrent neural network with gated recurrent units; and providing the result response to the user in reply to the query.

16. The system of claim 15, wherein the at least one processor is operative to:

receive an answer from the user in reply to the result response;

analyze the answer to determine user feedback for the result response, wherein determine the one or more context sentences for the query based at least on the query is performed utilizing a context summary system, wherein assign the emotion label to each sentence in the one or more context sentences to form labeled sentences is performed utilizing a sentiment system, and wherein select the result response from the response database based on the labeled sentences is performed utilizing a response prediction system; and train the context summary system, the sentiment system, and the response prediction system based on the user feedback.

* * * * *